(12) United States Patent
Oono et al.

(10) Patent No.: US 11,081,747 B2
(45) Date of Patent: *Aug. 3, 2021

(54) PACKAGING MATERIAL FOR POWER STORAGE DEVICE

(71) Applicant: TOPPAN PRINTING CO., LTD., Tokyo (JP)

(72) Inventors: Naoto Oono, Tokyo (JP); Kazuki Nishijima, Tokyo (JP); Koji Murata, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 114 days.

This patent is subject to a terminal disclaimer.

(21) Appl. No.: 14/267,320

(22) Filed: May 1, 2014

(65) Prior Publication Data
US 2014/0242333 A1 Aug. 28, 2014

Related U.S. Application Data

(63) Continuation of application No. PCT/JP2012/078874, filed on Nov. 7, 2012.

(30) Foreign Application Priority Data

Nov. 7, 2011 (JP) .............................. JP2011-243575
Nov. 7, 2011 (JP) .............................. JP2011-243579
Nov. 7, 2011 (JP) .............................. JP2011-243582

(51) Int. Cl.
*H01M 50/116* (2021.01)
*B32B 15/20* (2006.01)
(Continued)

(52) U.S. Cl.
CPC ............ *H01M 50/116* (2021.01); *B32B 7/12* (2013.01); *B32B 15/08* (2013.01); *B32B 15/088* (2013.01);
(Continued)

(58) Field of Classification Search
CPC ............ H01M 2/0287; H01M 2/1094; H01M 2/0292; H01M 50/24; H01M 50/116;
(Continued)

(56) References Cited

U.S. PATENT DOCUMENTS

2008/0119628 A1* 5/2008 Wada ................. C08G 18/0814
528/45
2008/0241663 A1* 10/2008 Yamashita ............ H01M 2/021
429/122
(Continued)

FOREIGN PATENT DOCUMENTS

JP 9-300532 11/1997
JP 2000-80327 3/2000
(Continued)

OTHER PUBLICATIONS

Sigma-Aldrich, "Hexamethylene diisocyanate", Sep. 16, 2015, http://www.sigmaaldrich.com/catalog/product/sial/52650?lang=en&region=US.*

(Continued)

*Primary Examiner* — Jasper Saberi

(57) ABSTRACT

A packaging material for a power storage device includes a base material layer which has at least a first adhesive layer, a metal foil layer, a corrosion prevention-treated layer, a second adhesive layer, and a sealant layer, sequentially laminated on the side of the first surface thereof; and a base material protective layer formed from at least one selected from the group consisting of a polyester polyol and an acrylic polyol, each containing a group having a hydroxyl group in a side chain thereof, and an aliphatic isocyanate curing agent, laminated on the side of the second surface of in the base material layer.

8 Claims, 1 Drawing Sheet

(51) Int. Cl.
  *B32B 15/095* (2006.01)
  *B32B 15/088* (2006.01)
  *B32B 7/12* (2006.01)
  *B32B 15/08* (2006.01)
  *B32B 15/09* (2006.01)
  *B32B 27/08* (2006.01)
  *B32B 27/34* (2006.01)
  *B32B 27/40* (2006.01)
  *B32B 27/36* (2006.01)
  *H01M 50/24* (2021.01)
  *H01M 50/124* (2021.01)
  *H01M 50/131* (2021.01)

(52) U.S. Cl.
  CPC ............ *B32B 15/09* (2013.01); *B32B 15/095* (2013.01); *B32B 15/20* (2013.01); *B32B 27/08* (2013.01); *B32B 27/34* (2013.01); *B32B 27/36* (2013.01); *B32B 27/40* (2013.01); *H01M 50/124* (2021.01); *H01M 50/24* (2021.01); *B32B 2307/518* (2013.01); *H01M 50/131* (2021.01); *H01M 2220/30* (2013.01); *Y10T 428/24355* (2015.01); *Y10T 428/31551* (2015.04); *Y10T 428/31562* (2015.04)

(58) Field of Classification Search
  CPC .......... H01M 50/124; Y10T 428/24355; B32B 7/12; B32B 27/40; C08L 75/04–16; C09D 175/04–16
  See application file for complete search history.

(56) References Cited

U.S. PATENT DOCUMENTS

| | | | | |
|---|---|---|---|---|
| 2009/0081523 A1* | 3/2009 | Stukas | ............. | H01M 8/04007 429/429 |
| 2010/0310911 A1* | 12/2010 | Yamamoto | .......... | H01M 2/0212 429/94 |
| 2012/0135301 A1* | 5/2012 | Akita | .................. | H01M 2/0212 429/185 |

FOREIGN PATENT DOCUMENTS

| | | | |
|---|---|---|---|
| JP | 2000-123799 | 4/2000 | |
| JP | 2001-93482 | 4/2001 | |
| JP | 2001-176463 | 6/2001 | |
| JP | 2001-243928 | 9/2001 | |
| JP | 2003-7261 | 1/2003 | |
| JP | 2003-181869 | 7/2003 | |
| JP | 2004-327039 | 11/2004 | |
| JP | 2005063685 A * | 3/2005 | |
| JP | 2007-269954 A | 10/2007 | |
| JP | 2009-64694 | 3/2009 | |
| JP | 2009-176513 | 8/2009 | |
| JP | 2009-181802 | 8/2009 | |
| JP | 2009-184262 | 8/2009 | |
| JP | 4559547 B2 | 10/2010 | |
| JP | 2011-54563 | 3/2011 | |
| JP | 2011-187385 | 9/2011 | |
| JP | 4771003 B1 | 9/2011 | |
| JP | 2012-156069 | 8/2012 | |
| JP | 2002-352778 | 12/2012 | |
| WO | WO 2011/016506 A1 | 2/2011 | |
| WO | WO-2011016506 A1 * | 2/2011 | .......... H01M 2/0212 |

OTHER PUBLICATIONS

JP2011-187385 English Translation.*
Thermal Resistance Theory and Practice, Jan. 2000, Infineon Technologies, p. 9.*
Tanaka et al, JP2000-123799 English translation, Apr. 28, 2000.*
Machine Translation of JP 2005-063685A (Year: 2005).*
International Search Report dated Feb. 12, 2013 in corresponding International Patent Application No. PCT/JP2012/078874.
Japanese Office Action dated Apr. 1, 2014 in corresponding Japanese Patent Application No. 2013-227670.
Japanese Office Action dated Jul. 8, 2014 in corresponding Japanese Patent Application No. 2013-543010.
Petition to the Commissioner of the Japan Patent Office dated Aug. 26, 2016, in corresponding Japanese Patent Application No. 2016-157013, 11 pgs.
"Polyurethane Resin Handbook," Nikkan Kogyo Shimbun, Ltd., Yoshiharu Iwata, Sep. 25, 1987, 1$^{st}$ Edition, pp. 31, 36, 406-407, 455.
Notice of Preliminary Rejection dated Aug. 30, 2018 in related Korean Patent Application No. 10-2014-7012210.
Notice of Dismissal of Amendment dated May 30, 2019 in Korean Patent Application No. 10-2014-7012210 (3 pages) (3 pages English Translation).
Office Action dated Mar. 27, 2020 in Korean Patent Application No. 10-2019-7018837.
English machine translation of JP 2000-80327, accessed on Sep. 25, 2020, at patents.google.com.

* cited by examiner

PACKAGING MATERIAL FOR POWER STORAGE DEVICE

CROSS REFERENCE TO RELATED APPLICATIONS

This application is a continuation application based on a PCT Patent Application No. PCT/JP2012/078874, filed Nov. 7, 2012, whose priority is claimed on Japanese Patent Application No. 2011-243575 filed on Nov. 7, 2011, Japanese Patent Application No. 2011-243579 filed on Nov. 7, 2011, and Japanese Patent Application No. 2011-243582 filed on Nov. 7, 2011, the contents of which are hereby incorporated by reference in their entirety.

BACKGROUND OF THE INVENTION

Field of the Invention

The present invention relates to a packaging material for a power storage device.

Description of the Related Art

As a power storage device used in portable terminal devices such as cell phones and notebook computers, video cameras, satellites, electric vehicles, or the like, for example, lithium ion batteries which can be produced in the ultrathin or minimized forms are known. In such a power storage device, contents such as positive electrodes, negative electrodes, separators, and electrolytic solutions are stored in a package in which a packaging material for a power storage device (hereinafter sometimes simply referred to as a "packaging material") is molded into a predetermined shape. As the package, packages in a metal can type in which metal plates are press-molded have been used in the related art, but packages in a laminate film type in which a laminate film having a metal foil such as an aluminum foil (for example, configurations such as base material layer/first adhesive layer/metal foil layer/second adhesive layer/sealant layer) is cold-molded have been widely used in recent years from the viewpoint that the degree of freedom in the shape is high and the weight can be easily reduced.

A power storage device using a laminate film as a packaging material is prepared by deep-drawing the laminate film by cold molding to form a concave portion, housing the content of the device in the concave portion, and heat-sealing the peripheral edge portion. The power storage device has an increased amount of storage as the concave portion is deeper, and thus the energy density is increased. For this, in a base material layer of the packaging material, a polyamide film having excellent moldability in which cracks or pinholes are hardly generated even with a deeper concave portion is suitably used (for example, Japanese Unexamined Patent Application, First Publication No. 2011-54563 (hereinbelow, refer to Patent Document 1) and Japanese Patent No. 4559547 (hereinbelow, refer to Patent Document 2)). However, the polyamide film does not have sufficient electrolytic solution resistance. Therefore, for example, in a case where a plurality of power storage devices are laminated, if the electrolytic solution is released by the generation of a breakage in one of the power storage devices, there is a concern that the base material layer may become molten by an electrolytic solution attached to the packaging material of another power storage device, and the metal foil layer on the inner side may be corroded. Furthermore, there are some cases where the scratch resistance is not sufficient, and during the handling, the surface of the base material layer becomes damaged, and thus, design properties, durability, and the like are lowered.

On the other hand, in Patent Document 1, it is described that for the purpose of further improving the moldability of a packaging material, a matte varnish layer is formed on the outer surface of a base material layer. The matte varnish layer is formed from olefin-based synthetic resins such as a cellulose-based synthetic resin, a vinyl chloride-vinyl acetate-based synthetic resin, a modified polyolefin-based synthetic resin, a rubber-based synthetic resin, an acryl-based synthetic resin, and a urethane-based synthetic resin, alkyd-based synthetic resins, or matting agents such as a silica-based matting agent and a kaolin-based matting agent. However, even if the matte varnish layer is provided, it is difficult to sufficiently inhibit the deterioration of the base material layer by the electrolytic solution and provide sufficient scratch resistance.

Moreover, in Patent Document 2, as a packaging material in which the electrolytic solution resistance and the scratch resistance of a base material layer are improved, the following structures are described.

(1) A packaging material in which a base material layer/a metal foil layer/a thermally adhesive resin layer are laminated in order from the outer side, and the base material layer includes a laminated film formed by the lamination of a biaxially stretched polyethylene terephthalate film and a biaxially stretched polyamide film from the outer side (Patent Document 2).

However, with the packaging material (1), the electrolytic solution resistance and scratch resistance are improved, but the moldability is lowered.

SUMMARY OF THE INVENTION

It is an object of the present invention to provide a packaging material for a power storage device, having excellent electrolytic solution resistance, scratch resistance, and moldability.

A packaging material for a power storage device of a first aspect of the present invention includes a base material layer having a first surface and a second surface and including at least a first adhesive layer, a metal foil layer, a corrosion prevention-treated layer, a second adhesive layer, and a sealant layer, which are sequentially laminated on the first surface; and a base material protective layer formed from at least one selected from the group consisting of polyester polyols and acrylic polyols, each of which contains a group having a hydroxyl group in the side chain thereof, and an aliphatic isocyanate curing agent, the base material protective layer being laminated on the second surface of the base material layer.

Furthermore, in the packaging material for a power storage device of the first aspect of the present invention, the base material protective layer preferably contains a urethane resin having a glass transition temperature Tg of 0° C. to 60° C.

Furthermore, in the packaging material for a power storage device of the first aspect of the present invention, the aliphatic isocyanate curing agent is preferably 1,6-hexamethylene diisocyanate.

Furthermore, in the packaging material for a power storage device of the first aspect of the present invention, a filler is preferably contained in the base material protective layer.

Furthermore, in the packaging material for a power storage device of the first aspect of the present invention, the filler is preferably a resin filler.

Furthermore, in the packaging material for a power storage device of the first aspect of the present invention, the base material layer preferably includes a polyamide film.

Furthermore, in the packaging material for a power storage device of the first aspect of the present invention, the metal foil layer is preferably an aluminum foil.

Furthermore, in the packaging material for a power storage device of the first aspect of the present invention, a corrosion prevention-treated layer is preferably formed on the surface where the metal foil layer is in contact with the base material layer.

Furthermore, a packaging material for a power storage device of a second aspect of the present invention includes a base material layer formed from a laminated film including a polyamide film having a thickness of 6 to 40 μm and a polyester film, the polyamide film and the polyester film being sequentially laminated in order from an inner side thereof to an outer surface thereof; at least a first adhesive layer, a metal foil layer, a corrosion prevention-treated layer, a second adhesive layer, and a sealant layer, which are sequentially laminated on one surface of the base material layer; and an irregular portion formed on the outer surface of the laminated film.

Furthermore, in the packaging material for a power storage device of the second aspect of the present invention, the metal foil layer is preferably an aluminum foil.

In addition, in the packaging material for a power storage device of the second aspect of the present invention, a corrosion prevention-treated layer is preferably formed on the surface where the metal foil layer is contacted with the base material layer.

Advantageous Effects of Invention

The packaging materials for power storage devices according to the first and second aspects of the present invention have excellent electrolytic solution resistance, scratch resistance, and moldability.

DETAILED DESCRIPTION OF THE INVENTION

In the present specification, (meth)acrylic acid means acrylic acid or methacrylic acid, and this shall apply to other compounds.

First Embodiment

Hereinafter, one example of the packaging material for a power storage device in a first embodiment of the present invention will be described in detail.

Figure 1:
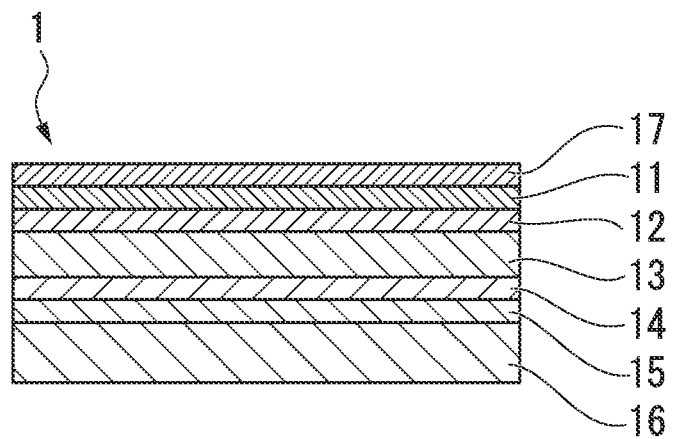
FIG. 1 is a cross-sectional view showing one example of the packaging material for a power storage device of the present invention.

A packaging material 1 for a power storage device of the present embodiment (hereinafter sometimes simply referred to as a "packaging material 1") is a laminate in which a first adhesive layer 12, a metal foil layer 13, a corrosion prevention-treated layer 14, a second adhesive layer 15, and a sealant layer 16 are sequentially laminated on the first surface of the base material layer 11, and a base material protective layer 17 is laminated on the second surface of the base material layer 11, as shown in FIG. 1. The packaging material 1 is used such that the base material protective layer 17 becomes an outermost layer and the sealant layer 16 becomes an innermost layer when the packaging material is used as a packaging material for a power storage device. The packaging material 1 is a packaging material in which the base material protective layer 17 is laminated on the outer side (the second surface) of the base material layer 11.

(Base Material Protective Layer 17)

The base material protective layer 17 is a layer laminated on a surface (second surface) on the outer side of the base material layer 11, and is formed from at least one selected from the group consisting of polyester polyols and acrylic polyols, each containing a group (functional group) having a hydroxyl group in the side chain thereof (hereinafter sometimes collectively referred to as a "polyol") and an aliphatic isocyanate curing agent. By providing the base material protective layer 17, the base material layer 11 is inhibited from being deteriorated by the electrolytic solution.

The polyester polyol containing a group (functional group) having a hydroxyl group in the side chain thereof (hereinafter sometimes also referred to as a "polyester polyol (a1)") is a polyester polyol containing a hydroxyl group in the side chain thereof, in addition to a hydroxyl group at one end of a repeating unit.

Examples of the polyester polyol (a1) include polyester polyols obtained by reacting at least one kind of dibasic acid with at least one kind of compound having 3 or more hydroxyl groups. The group at the unreacted site in the hydroxyl group of a compound having 3 or more hydroxyl groups becomes the hydroxyl group in the side chain of the polyester polyol (a1).

Examples of the dibasic acid include aliphatic dibasic acids such as succinic acid, glutaric acid, adipic acid, pimelic acid, suberic acid, azelaic acid, sebacic acid, and brassylic acid; and aromatic dibasic acids such as isophthalic acid, terephthalic acid, and naphthalene dicarboxylic acid.

Examples of the compound having 3 or more hydroxyl groups include hexanetriol, trimethylolpropane, and pentaerythritol.

Furthermore, as the polyester polyol (a1), a compound formed by the reaction of a diol, if desired, in addition to the dibasic acid and the compound having 3 or more hydroxyl groups, may be used.

Examples of the diol include aliphatic diols such as ethylene glycol, propylene glycol, butanediol, neopentyl glycol, methyl pentane diol, hexane diol, heptane diol, octane diol, nonane diol, decane diol, and dodecane diol; alicyclic diols such as cyclohexane diol and hydrogenated xylylene glycol; and aromatic diols such as xylylene glycol.

Furthermore, polyester urethane polyols in which hydroxyl groups at both ends of the polyester polyol have undergone a reaction with at least one kind of bifunctional or higher isocyanate compound for chain elongation may be used.

Examples of the bifunctional or higher isocyanate compound include 2,4- or 2,6-tolylene diisocyanate, xylylene diisocyanate, 4,4'-diphenylmethane diisocyanate, methylene diisocyanate, isopropylene diisocyanate, lysine diisocyanate, 2,2,4- or 2,4,4-trimethyl hexamethylene diisocyanate, 1,6-hexamethylene diisocyanate, methylcyclohexane diisocyanate, isophorone diisocyanate, 4,4'-dicyclohexylmethane diisocyanate, and isopropylidene dicyclohexyl-4,4'-diisocyanate. Furthermore, polyester urethane polyols in which adduct forms, biuret forms, or isocyanurate forms of these isocyanate compounds are used for chain elongation may also be used.

The acrylic polyol containing a group having a hydroxyl group in the side chain thereof (hereinafter sometimes referred to as an "acrylic polyol (a2)") is an acrylic polyol containing a hydroxyl group in the side chain thereof, in addition to a hydroxyl group at one end of the repeating unit.

Examples of the acrylic polyol (a2) include, as a main component, a copolymer having a repeating unit derived from a (meth)acrylic acid, obtained by the copolymerization of at least hydroxyl group-containing acryl monomer and a (meth)acrylic acid.

Examples of the hydroxyl group-containing acryl monomer include 2-hydroxyethyl (meth)acrylate and 2-hydroxypropyl (meth)acrylate.

Examples of the component which is copolymerized with a hydroxyl group-containing acryl monomer and a (meth) acrylic acid include alkyl (meth)acrylate-based monomers (examples of the alkyl group include a methyl group, an ethyl group, an n-propyl group, an i-propyl group, an n-butyl group, an i-butyl group, a t-butyl group, a 2-ethylhexyl group, and a cyclohexyl group); amide group-containing monomers such as (meth)acrylamide, N-alkyl (meth)acrylamide, N,N-dialkyl (meth)acrylamide (examples of the alkyl group include a methyl group, an ethyl group, an n-propyl group, an i-propyl group, an n-butyl group, an i-butyl group, a t-butyl group, a 2-ethylhexyl group, and a cyclohexyl group), N-alkoxy (meth)acrylamide, N,N-dialkoxy (meth) acrylamide (examples of the alkoxy group include a methoxy group, an ethoxy group, a butoxy group, and an isobutoxy group), N-methylol (meth)acrylamide, and N-phenyl (meth)acrylamide; glycidyl group-containing monomers such as glycidyl (meth)acrylate and allylglycidyl ether; silane-containing monomers such as (meth)acryloxypropyl trimethoxysilane, (meth)acryloxypropyl triethoxysilane; and isocyanate group-containing monomers such as (meth)acryloxypropyl isocyanate.

As the polyol, the acrylic polyol (a2) is preferable from the viewpoint that the electrolytic solution resistance is superior.

The polyol can be used according to the required functions or performance, and may be used alone or in combination of two or more kinds thereof. By using these polyols and aliphatic isocyanate curing agents, a base material protective layer 17 formed from the polyurethane resin is obtained.

The aliphatic isocyanate curing agent is a bifunctional or higher isocyanate compound having no aromatic ring. The aliphatic isocyanate curing agent is suitable for the outermost layer since it does not have an aromatic ring, and as a result, a benzene ring does not becomes a quinoid by ultraviolet rays and yellowing is inhibited. Examples of the aliphatic isocyanate curing agent include methylene diisocyanate, isopropylene diisocyanate, lysine diisocyanate, 2,2, 4- or 2,4,4-trimethyl hexamethylene diisocyanate, 1,6-hexamethylene diisocyanate, methylcyclohexane diisocyanate, isophorone diisocyanate, 4,4'-dicyclohexylmethane diisocyanate, and isopropylidene dicyclohexyl-4,4'-diisocyanate. Furthermore, adduct forms, biuret forms, or isocyanurate forms of these isocyanate compounds may also be used.

As the aliphatic isocyanate curing agent, 1,6-hexamethylene diisocyanate and isophorone diisocyanate are preferable from the viewpoint that the electrolytic solution resistance is improved. In addition to the improvement of self-repairing performance of a curing agent, with regard to the reactivity of the aliphatic isocyanate curing agent with a hydroxyl group of the polyol, the reactivity of 1,6-hexamethylene diisocyanate with a hydroxyl group of the polyol is higher than the reactivity of the isophorone diisocyanate with a hydroxyl group of the polyol, and therefore, taking mass production into consideration, 1,6-hexamethylene diisocyanate is particularly preferable.

The molar ratio (NCO/OH) of the isocyanate groups contained in the aliphatic isocyanate curing agent to the hydroxyl groups contained in the polyol is preferably from 0.5 to 50, and more preferably 1 to 20. In the case where the molar ratio (NCO/OH) is a lower limit (0.5) or more, the scratch resistance and the electrolytic solution resistance are improved. In the case where the molar ratio (NCO/OH) is an upper limit (50) or less, the adhesiveness between the base material protective layer and the base material can be easily ensured.

The thickness of the base material protective layer 17 is preferably 1 to 10 μm, and more preferably 1 to 5 μm. In the case where the thickness of the base material protective layer 17 is a lower limit (1 μm) or more, it is easy to obtain excellent electrolytic solution resistance. In the case where the thickness of the base material protective layer 17 is an upper limit (10 μm) or less, it is easy to obtain a thinner base material, and thus to obtain stretching performance.

The outer surface of the base material protective layer 17 is preferably matting-treated. By such a treatment, the sliding property of the base material protective layer 17 surface is improved, and thus, it is easy to inhibit the packaging material 1 from being excessively adhered to a mold in cold molding, and thus, to improve moldability. Furthermore, a matting effect is also obtained.

The base material protective layer 17 may be blended with additives such as a flame retardant, a lubricant, an anti-blocking agent, an antioxidant, a photostabilizer, and a tackifier.

Examples of the lubricant include fatty acid amides such as oleic acid amide, erucic acid amide, stearic acid amide, behenic acid amide, ethylenebisoleic acid amide, and ethylenebiserucic acid amide. As the anti-blocking agents, various filler-based anti-blocking agents such as silica are preferable.

These additives may be used alone or in combination of two or more kinds thereof.

(Base Material Layer 11)

The base material layer 11 serves to impart heat resistance in the sealing step during the preparation of a power storage device to inhibit the generation of pinholes that may occur during molding processing or distribution. In particular, in the case of packaging materials for lithium ion batteries, for example, in large scale uses, abrasion resistance, chemical resistance, insulating properties, or the like can also be imparted.

The base material layer 11 is preferably a resin film formed by a resin having insulating properties. Examples of the resin film include stretched or unstretched films such as a polyester film, a polyamide film, and a polypropylene film. The base material layer 11 may be a monolayer film of these resin films or a laminated film formed by using two or more kinds of these resin films.

As the base material layer 11, among the materials as described above, the polyamide film is preferable from the viewpoint that the moldability is excellent. Examples of the polyamide resin that forms the polyamide film include nylon 6, nylon 11, nylon 12, nylon 66, nylon 610, and nylon 612.

The thickness of the base material layer 11 is preferably 6 to 40 μm, and more preferably 10 to 30 μm. In the case where the thickness of the base material layer 11 is a lower limit (6 μm) or, the pinholes resistance and the insulating properties are improved. In the case where the thickness of the base material layer 11 is an upper limit (40 μm) or less, the moldability is improved.

(First Adhesive Layer 12)

The first adhesive layer 12 is formed between the base material layer 11 and the metal foil layer 13. The first adhesive layer 12 has adhesive force required to adhere the base material layer 11 firmly to the metal foil layer 13, and Furthermore, the conformability to protect the metal foil layer 13 from being broken by the base material layer 11 during the cold molding (performance to reliably form a first adhesive layer 12 on a member without being stripped even when the member is modification-stretched) and the like are also required.

Examples of the first adhesive layer 12 include two-liquid curable polyurethane-based adhesives in which a polyol such as a polyester polyol, a polyether polyol, and an acrylic polyol is used as a primary agent and an aromatic or aliphatic isocyanate is used as a curing agent. The molar ratio (NCO/OH) of the isocyanate groups in the curing agent to the hydroxyl groups in the primary agent is preferably 1 to 10, and more preferably 2 to 5.

The thickness of the first adhesive layer 12 is preferably 1 to 10 μm, and more preferably 2 to 6 μm, to obtain desired adhesion strength, conformability, processability, or the like.

In addition, it is preferable to add an appropriate amount of fillers such as inorganic materials, or pigments to the first adhesive layer 12, for the purpose of preventing delamination of a stretched portion under a condition of a high temperature (80° C., 3 days).

(Metal Foil Layer 13)

As the metal foil layer 13, various metal foils such as foils of aluminum and stainless steel can be used, and in view of a moisture-proof property, processability such as ductility, and cost, an aluminum foil is preferable.

As the aluminum foil, for example, known soft aluminum foils may be used, and in order to obtain desired pinholes resistance and ductility during the molding, an iron-containing aluminum foil is preferable. The content of iron in the aluminum foil (100% by mass) is preferably 0.1% by mass to 9.0% by mass, and more preferably 0.5% by mass to 2.0% by mass. In the case where the content of iron is a lower limit (0.1% by mass) or more, the pinholes resistance and the ductility are improved. If the content of iron is an upper limit (9.0% by mass) or less, the flexibility is improved.

In addition, as the aluminum foil, a soft aluminum foil which has been subjected to an annealing treatment is more preferable in order to impart desired ductility in molding.

The thickness of the metal foil layer 13 is preferably 9 to 200 μm, and more preferably 15 to 150 μm, in order to obtain desired barrier properties, pinholes resistance, and processability.

In particular, a preferred metal foil layer 13 is a soft aluminum foil having a thickness of 15 to 150 μm, which has been subjected to an annealing treatment. Specifically, Materials 8021 and 8079 in JIS standard are preferable.

The aluminum foil used in the metal foil layer 13 is preferably one which has been subjected to a degreasing treatment, in order to obtain desired electrolytic solution resistance. Furthermore, an aluminum foil in which the surface has not been etched is preferable, in order to simplify the preparation step.

The degreasing treatments are largely classified into a wet type degreasing treatment and a dry type degreasing treatment, and in order to simplify the preparation step, the dry type degreasing treatment is preferable.

Examples of the dry type degreasing treatment include a method in which a degreasing treatment is carried out by elongating the treatment time in a step of subjecting an aluminum foil to an annealing treatment. A sufficient electrolytic solution resistance can be obtained even using the degreasing treatment carried out at the same time as the annealing treatment is carried out to soften the aluminum foil. Furthermore, in addition to the degreasing treatment, a frame treatment, a corona treatment, and the like may be included. In addition, it is possible to adopt a degreasing treatment in which contaminants are oxidatively decomposed and removed by active oxygen generated by the irradiation with ultraviolet rays at a specific wavelength.

Examples of the wet type degreasing treatment include acid degreasing and alkali degreasing.

Examples of the acid used for the acid degreasing include inorganic acids such as sulfuric acid, nitric acid, hydrochloric acid, and hydrofluoric acid. These acids may be used alone or in combination of two or more kinds thereof. Examples of the alkali used for the alkali degreasing include sodium hydroxide having a high etching effect. Furthermore, materials in which a weakly alkaline system or a surfactant is blended may be included.

The wet type degreasing treatment is carried out by a dipping method or a spraying method.

(Corrosion prevention-treated Layer 14)

The corrosion prevention-treated layer 14 serves to adhere the metal foil layer 13 firmly to the second adhesive layer 15, and to protect the metal foil layer 13 from an electrolytic solution or hydrofluoric acid generated from the electrolytic solution.

The corrosion prevention-treated layer 14 is formed, for example, by a hydrothermal modification treatment, an anodic oxidation treatment, a chemical conversion treatment, or a combination of these treatments.

Examples of the hydrothermal modification treatment include a boehmite treatment in which an aluminum foil is dip-treated in boiling water to which triethanolamine has been added. Examples of the anodic oxidation treatment include an alumite treatment. Examples of the chemical conversion treatment include a chromate treatment, a zirconium treatment, a titanium treatment, a vanadium treatment, a molybdenum treatment, a calcium phosphate treatment, a strontium hydroxide treatment, a cerium treatment, a ruthenium treatment, or various chemical conversion treatments formed with a mixed layer thereof. Furthermore, these chemical conversion treatments are not limited to the wet type of treatments, and a method in which these treatment agents are mixed with a resin component and can also be applied.

As described above, among these corrosion prevention treatments, a coating type chromate treatment is preferable from the viewpoint of achieving maximization of the effect and treatment of the waste liquid.

Moreover, the corrosion prevention-treated layer 14 may also be formed only by a pure coating technique, in addition to the above-described chemical conversion treatments. Examples of such a method include a method using a sol of oxides of rare earth elements such as cerium oxide, having an average particle diameter of 100 nm or less, as a material which has a corrosion prevention effect (inhibitor effect) of aluminum and is suitable in an environmental aspect. By using this method, it is possible to impart a metal foil corrosion prevention effect of an aluminum foil or the like even using a general coating method.

(Second Adhesive Layer 15)

The second adhesive layer 15 is a layer in which the corrosion prevention-treated layer 14 and the sealant layer 16 are adhered to each other. The packaging material 1 is largely classified into one having a heat laminate configuration and one having a dry laminate configuration according to the kind of the second adhesive layer 15.

In the case of the dry laminate configuration, it is possible to use the same adhesive as those mentioned as the first adhesive layer 12 as a component that forms the second adhesive layer 15. In this case, in order to inhibit the swelling due to the electrolytic solution or hydrolysis by hydrofluoric acid, the adhesive used needs to be subjected to composition design, for example, of using a primary agent having a skeleton which is difficult to hydrolyze, or of enhancing the crosslinking density.

Examples of the technique for enhancing the crosslinking density include a method using a dimeric fatty acid, an ester or a hydrogenated product of the dimeric fatty acid, a reduced glycol of the dimeric fatty acid, or a reduced glycol of an ester or a hydrogenated product of the dimeric fatty acid. The dimeric fatty acid is an acid formed by dimerizing various unsaturated fatty acids, and examples of the structure thereof include non-cyclic, monocyclic, polycyclic, and aromatic cyclic structures. The polybasic acid, which is a raw material of the polyester polyol used as an adhesive that forms the second adhesive layer 15, is not particularly limited. Furthermore, the fatty acid, which is a starting material of the dimeric fatty acid, is not particularly limited. In addition, a dibasic acid used in common polyester polyols may be incorporated, using such a dimeric fatty acid as an essential component.

It is possible to use an isocyanate compound, which can be used as a chain elongation agent for the polyester polyol, as a curing agent for the primary agent. In this case, the crosslinking density of the adhesive coating film is enhanced and correspondingly, the dissolution or swelling properties are improved, and the concentration of urethane groups is increased. Therefore, it is expected to improve the adhesion to a base material.

In the case of the configuration of a heat laminate, as a component that forms the second adhesive layer 15, an acid-modified polyolefin-based resin formed by the graft-modification of a polyolefin-based resin with an acid is preferable. Examples of the polyolefin-based resin include low-density polyethylene, medium-density polyethylene, and high-density polyethylene; ethylene-α-olefin copolymers; homo, block, or random polypropylenes; and propylene-α-olefin copolymers. The polyolefin-based resins may be used alone or in combination of two or more kinds thereof. Examples of the graft-modification acid include carboxylic acid, an epoxy compound, and an acid anhydride, and maleic anhydride is preferable.

As the component that constitutes the second adhesive layer 15, a maleic anhydride-modified polyolefin-based resin formed by the graft-modification of a polyolefin-based resin with maleic anhydride is preferable, and a maleic anhydride-modified polypropylene is particularly preferable, in order to facilitate to maintain the adhesive force between the sealant layer 16 and the metal foil layer 13 even when the electrolytic solution penetrates thereinto.

In the case where the second adhesive layer 15 is formed by extrusion molding, it is easy to align the adhesive resin in the MD direction (machine direction) with the stress generated during the extrusion molding. In this case, in order to reduce the anisotropy of the second adhesive layer 15, an elastomer may be blended in the second adhesive layer 15.

Examples of the elastomer blended in the second adhesive layer 15 include olefin-based elastomers and styrene-based elastomers. The average particle diameter of the blended elastomer is preferably 200 nm or less in order to improve the compatibility between the elastomer and the adhesive resin and the effect of reducing the anisotropy of the second adhesive layer 15. Furthermore, the average particle diameter is measured by photographing an enlarged cross-section of the elastomer composition by an electron microscope, and measuring the average particle diameter of the cross-linked rubber components dispersed by image analysis.

These elastomers may be used alone or in combination of two or more kinds thereof.

In the case where the elastomer is blended in the second adhesive layer 15, the blending amount of the elastomer in the second adhesive layer 15 (100% by mass) is preferably 1% by mass to 25% by mass, and more preferably 10% by mass to 20% by mass. In the case where the blending amount of the elastomer is a lower limit (1% by mass) or more, the compatibility with the adhesive resin is improved, and the effect of reducing the anisotropy of the second adhesive layer 15 is improved. In the case where the blending amount of the elastomer is an upper limit (25% by mass) or less, it is easy to inhibit the second adhesive layer 15 from being swollen by the electrolytic solution.

The second adhesive layer 15 may be formed by using a dispersion type of an adhesive resin solution in which the adhesive resin is dispersed in an organic solvent.

The thickness of the second adhesive layer 15 is preferably 1 to 40 μm, and more preferably 5 to 20 μm.

(Sealant Layer 16)

The sealant layer 16 is the inner layer of the packaging material 1, which is a layer thermally welded during the assembly to a battery. That is, the sealant layer 16 is a layer including a thermally weldable film.

Examples of the component of the film constituting the sealant layer 16 include a polyolefin-based resin, and an acid-modified polyolefin-based resin formed by the graft-modification of the polyolefin-based resin with maleic anhydride or the like. Among these, a polyolefin-based resin is preferable, and polypropylene is particularly preferable, in order to improve the water vapor barrier properties, and thus, easily form a battery form without excessive collapse by heat sealing. Examples of the polypropylene include the polypropylene exemplified in the second adhesive layer 15.

The sealant layer 16 may be formed from a film having a mixture of various resins as described above.

The sealant layer 16 may be a monolayer film or a multilayer film.

In the case of using a film formed by extrusion molding, since the sealant layer 16 tends to be aligned in the extrusion direction of the film, an elastomer may be blended in the sealant layer 16 in order to reduce the anisotropy of the sealant layer 16 by the alignment. By providing this, it becomes easy to inhibit the sealant layer 16 from being whitened when the packaging material 1 is subjected to cold molding to form a concave portion.

As the elastomer blended in the sealant layer 16, the same materials as the materials mentioned as the elastomer blended in the second adhesive layer 15 can be used, and the preferable materials are also the same.

In the case where the sealant layer 16 is a laminated film, the elastomer may be blended in a certain layer or all the layers out of the layers. For example, in the case where the sealant layer 16 has a trilayer configuration of random polypropylene/block polypropylene/random polypropylene, the elastomer may be blended in only the layer of block polypropylene, only the layer of random polypropylene, or both of the layer of random polypropylene and the layer of block polypropylene.

Moreover, a lubricant may be blended in the sealant layer 16 for the purpose of imparting a sliding property. By providing this, when the packaging material 1 is subjected to cold molding to form a concave portion, it becomes easy to prevent the portion which is a side or angle of the concave portion having a high stretching rate in the packaging material 1 from being stretched more than necessary. As a result, it becomes easy to inhibit the stripping between the metal foil layer 13 and the second adhesive layer 15, or the breakage or whitening due to cracks in the sealant layer 16 and the second adhesive layer 15.

In the case where the lubricant is blended in the sealant layer 16, the blending amount of the lubricant in the sealant layer 16 (100% by mass) is preferably 0.001% by mass to 0.5% by mass. In the case where the blending amount of the lubricant is 0.001% by mass or more, it is easy to obtain an effect of inhibiting the sealant layer 16 from being whitened during the cold molding. In the case where the blending amount of the lubricant is 0.5% by mass or less, the lubricant bleeds on the laminate surface (laminated surface) of other layers of the packaging material 1 from the sealant layer, and it is thus easy to inhibit reduction of the adhesion strength.

(Preparation Method)

Hereinafter, the method for preparing the packaging material 1 will be described. However, the method for preparing the packaging material 1 is not limited to the methods described below.

Examples of the method for preparing the packaging material 1 include a method including the following steps (I) to (IV).

(I) A step of forming the corrosion prevention-treated layer 14 on the metal foil layer 13.

(II) A step of bonding the base material layer 11, through the first adhesive layer 12, onto the surface opposite to the surface on which the corrosion prevention-treated layer 14 in the metal foil layer 13 is formed.

(III) A step of bonding the sealant layer 16, through the second adhesive layer 15, onto the side of the corrosion prevention-treated layer 14 in the metal foil layer 13.

(IV) A step of laminating the base material protective layer 17 on the base material layer 11.

Step (I):

The corrosion prevention-treated layer 14 is formed, for example, by coating a corrosion prevention treatment agent, followed by drying, curing, and baking, on one surface of the metal foil layer 13. Examples of the corrosion prevention treatment agent include a corrosion prevention treatment agent for a coating type chromate treatment.

The method for coating the corrosion prevention treatment agent is not particularly limited, and examples thereof include gravure coating, gravure reverse coating, roll coating, reverse roll coating, die coating, bar coating, kiss coating, and comma coating.

In addition, an unreacted metal foil may be used in the metal foil layer 13, and a metal foil which has been subjected to a degreasing treatment by a wet type or dry type of a degreasing treatment may also be used.

Step (II):

The base material layer 11 is bonded on the surface opposite to the surface on which the corrosion prevention-treated layer 14 in the metal foil layer 13 is formed, using an adhesive for forming the first adhesive layer 12.

Examples of the method for bonding include techniques of dry lamination, non-solvent lamination, wet lamination, and the like.

In the step (II), an aging treatment in the range from room temperature to 100° C. may be carried out in order to promote the adhesiveness.

Step (III):

The sealant layer 16 is bonded, through the second adhesive layer 15, on the side of the corrosion prevention-treated layer 14 in the laminate in which the base material layer 11, the first adhesive layer 12, the metal foil layer 13, and the corrosion prevention-treated layer 14 are laminated in this order.

In the case of the dry laminate configuration, the sealant layer 16 is bonded on the side of the corrosion prevention-treated layer 14 in the laminate using the above-described adhesive, with a technique of dry lamination, non-solvent lamination, wet lamination, or the like.

In the case of the heat laminate configuration, for example, the following dry process and wet process may be included. In the case of the dry process, the adhesive resin is extrusion-laminated on the corrosion prevention-treated layer 14 of the laminate to form the second adhesive layer 15. Furthermore, the film that forms the sealant layer 16 is laminated on the second adhesive layer 15. In addition, the film that forms the sealant layer 16 is obtained by an inflation method or a cast method. Thereafter, a heat treatment (aging treatment, heat lamination, or the like) may be carried out for the purpose of improving the adhesion between the corrosion prevention-treated layer 14 and the second adhesive layer 15. Furthermore, a multilayer film in which the second adhesive layer 15 and the sealant layer 16 are laminated by an inflation method or a cast method is fabricated, and by laminating the multilayer film on the laminate by heat lamination, the sealant layer 16 may be laminated through the second adhesive layer 15.

In the case of the wet process, a dispersion type of an adhesive resin solution of an adhesive resin such as an acid-modified polyolefin-based resin is coated on the corrosion prevention-treated layer 14 of the laminate, the solvent is volatilized at a temperature no lower than the melting point of the adhesive resin, and the adhesive resin is melt-softened, and baked to form the second adhesive layer 15. Thereafter, the sealant layer 16 is laminated on the second adhesive layer 15 by heat treatment such as heat lamination.

Step (IV):

The base material protective layer 17 is laminated on the outer surface (second surface) of the base material layer 11. Examples of the method in which the base material protective layer 17 is laminated on the outer surface (second surface) of the base material layer 11 include a method in which a dispersion type of a coating liquid of a urethane resin that forms the base material protective layer 17 is prepared, coated by various coating methods such as a dipping method and a spraying method, the solvent is volatilized by heating, and baking is carried out. Furthermore, the base material protective layer 17 can also be formed by extrusion molding for melting and extruding the urethane resin. In addition, the outer surface of the base material protective layer 17 may be subjected to processing such as a matting treatment.

By the steps (I) to (IV) as describe above, the packaging material 1 is obtained.

Furthermore, the method for preparing the packaging material 1 is not limited to the methods in which the steps (I) to (IV) are sequentially carried out. For example, the step (I) may be carried out after the step (II). Furthermore, the step (II) may be carried out after the step (IV). Furthermore, formation of the corrosion prevention-treated layer 14 and extrusion lamination of the sealant layer 16 on the second adhesive layer 15 may be carried out continuously in-line. In addition, a corrosion prevention-treated layer may be provided on both sides of the metal foil layer.

The packaging material in the first embodiment of the present invention as described above has a base material protective layer laminated on the outer surface (second surface) of the base material layer, and thus has excellent electrolytic solution resistance. Therefore, even when an electrolytic solution is adhered onto the surface of the base material layer in the packaging material, deterioration of the base material layer, and the side of the base material layer in the metal foil layer can be inhibited. The base material protective layer in the packaging material in the first embodiment of the present invention is formed from a urethane resin formed of a specific polyol and a curing agent, unlike the matte varnish layer in the above-described packaging material in the related art, and thus, it is thought to obtain excellent electrolytic solution resistance. The reason why the effect is obtained by the urethane resin having such a specific configuration is not necessarily clear, but is thought to be as follows. It is thought that by using the polyester polyol (a1) or the acrylic polyol (a2), each having hydroxyl groups at least at a site other than the end, instead of polyether polyols having hydroxy groups arranged only at the end of the main chain, the crosslinking points increase and the electrolytic solution resistance is improved. Particularly, it is thought since the acrylic polyol (a2) has groups having hydroxyl groups arranged randomly as a side chain with respect to the main chain, the crosslinking points increase and the electrolytic solution resistance is improved.

Furthermore, the packaging material in the first embodiment of the present invention is not limited to the packaging material 1. For example, a corrosion prevention-treated layer may be formed on both sides of the metal foil layer. In the case where the corrosion prevention-treated layer is formed on the side of the base material layer in the metal foil layer, it becomes easier to inhibit the corrosion of the side of the base material layer in the metal foil layer with an electrolytic solution.

Second Embodiment

Hereinafter, a second embodiment of the present invention will be described.

In the second embodiment of the present invention, the base material protective layer 17 in the first embodiment of the present invention is a layer containing a urethane resin having a glass transition temperature Tg of 0° C. to 60° C., which is formed from at least one selected from the group consisting of a polyester polyol and an acrylic polyol, each containing a group having a hydroxyl group in the side chain thereof, (hereinafter sometimes collectively referred to as a "polyol") and an aliphatic isocyanate curing agent (hereinafter sometimes also referred to as a "urethane resin (A)").

Hereinafter, one example of the packaging material for a power storage device in the second embodiment of the present invention is shown and described in detail. The packaging material for a power storage device in the second embodiment of the present invention can be described with reference to FIG. 1, as in the first embodiment. Hereinafter, in the description of the second embodiment of the present invention, the same symbols as in the first embodiment of the present invention are used for the description.

The packaging material 1 for a power storage device of the present embodiment (hereinafter sometimes simply referred to as an "packaging material 1") is a laminate in which the first adhesive layer 12, the metal foil layer 13, the corrosion prevention-treated layer 14, the second adhesive layer 15, and the sealant layer 16 are sequentially laminated on one surface of the base material layer 11, and the base material protective layer 17 is laminated on the other surface of the base material layer 11, as shown in FIG. 1. The packaging material 1 is used such that the base material protective layer 17 becomes an outermost layer and the sealant layer 16 becomes an innermost layer. The packaging material 1 is a packaging material in which the base material protective layer 17 is laminated on the outer side of the base material layer 11.

(Base Material Protective Layer 17)

In the second embodiment of the present invention, the base material protective layer 17 is a layer laminated on the outer surface of the base material layer 11, and is a layer containing a urethane resin having a glass transition temperature Tg of 0° C. to 60° C., which is formed from at least one selected from the group consisting of a polyester polyol and an acrylic polyol, each containing a group having a hydroxyl group in the side chain thereof, (hereinafter sometimes collectively referred to as a "polyol") and an aliphatic isocyanate curing agent (hereinafter sometimes also referred to as a "urethane resin (A)").

Through the base material protective layer 17, the deterioration of the base material layer 11 by the electrolytic solution is inhibited to impart excellent scratch resistance.

The polyester polyol containing a group having a hydroxyl group in the side chain thereof (hereinafter sometimes referred to as a "polyester polyol (a1)") is a polyester polyol containing a hydroxyl group in the side chain thereof, in addition to a hydroxyl group at the end of the repeating unit.

In the second embodiment of the present invention, the same polyester polyol (a1) as in the first embodiment can be used.

Examples of the polyester polyol (a1) include polyester polyols obtained by reacting at least one kind of dibasic acid with at least one kind of compound having 3 or more hydroxyl groups. The group at the unreacted site in the hydroxyl group of a compound having 3 or more hydroxyl groups becomes the hydroxyl group in the side chain of the polyester polyol (a1).

Examples of the dibasic acid include aliphatic dibasic acids such as succinic acid, glutaric acid, adipic acid, pimelic acid, suberic acid, azelaic acid, sebacic acid, and brassylic acid; and aromatic dibasic acids such as isophthalic acid, terephthalic acid, and naphthalene dicarboxylic acid.

Examples of the compound having 3 or more hydroxyl groups include hexanetriol, trimethylolpropane, and pentaerythritol.

Furthermore, as the polyester polyol (a1), a compound formed by the reaction of a diol, if desired, in addition to the dibasic acid and the compound having 3 or more hydroxyl groups, may be used.

Examples of the diol include aliphatic diols such as ethylene glycol, propylene glycol, butanediol, neopentyl glycol, methyl pentane diol, hexane diol, heptane diol, octane diol, nonane diol, decane diol, and dodecane diol; alicyclic diols such as cyclohexane diol and hydrogenated xylylene glycol; and aromatic diols such as xylylene glycol.

Furthermore, polyester urethane polyols in which hydroxyl groups at both ends of the polyester polyol have undergone a reaction with at least one kind of bifunctional or higher isocyanate compound for chain elongation may be used.

Examples of the bifunctional or higher isocyanate compound include 2,4- or 2,6-tolylene diisocyanate, xylylene diisocyanate, 4,4'-diphenylmethane diisocyanate, methylene diisocyanate, isopropylene diisocyanate, lysine diisocyanate, 2,2,4- or 2,4,4-trimethyl hexamethylene diisocyanate, 1,6-hexamethylene diisocyanate, methylcyclohexane diisocyanate, isophorone diisocyanate, 4,4'-dicyclohexylmethane diisocyanate, and isopropylidene dicyclohexyl-4,4'-diisocyanate. Furthermore, polyester urethane polyols in which adduct forms, biuret forms, or isocyanurate forms of these isocyanate compounds are used for chain elongation may also be used.

The acrylic polyol containing a group having a hydroxyl group in the side chain thereof (hereinafter sometimes referred to as an "acrylic polyol (a2)") is an acrylic polyol containing a hydroxyl group in the side chain thereof, in addition to a hydroxyl group at one end of the repeating unit.

The same acrylic polyol (a2) as in the first embodiment can also be used in the second embodiment of the present invention.

Examples of the acrylic polyol (a2) include, as a main component, a copolymer having a repeating unit derived from a (meth)acrylic acid, obtained by the copolymerization of at least hydroxyl group-containing acryl monomer and a (meth)acrylic acid.

Examples of the hydroxyl group-containing acryl monomer include 2-hydroxyethyl (meth)acrylate and 2-hydroxypropyl (meth)acrylate.

Examples of the component which is copolymerized with a hydroxyl group-containing acryl monomer and a (meth)acrylic acid include alkyl (meth)acrylate-based monomers (examples of the alkyl group include a methyl group, an ethyl group, an n-propyl group, an i-propyl group, an n-butyl group, an i-butyl group, a t-butyl group, a 2-ethylhexyl group, and a cyclohexyl group); amide group-containing monomers such as (meth)acrylamide, N-alkyl (meth)acrylamide, N,N-dialkyl (meth)acrylamide (examples of the alkyl group include a methyl group, an ethyl group, an n-propyl group, an i-propyl group, an n-butyl group, an i-butyl group, a t-butyl group, a 2-ethylhexyl group, and a cyclohexyl group), N-alkoxy(meth)acrylamide, N,N-dialkoxy (meth)acrylamide (examples of the alkoxy group include a methoxy group, an ethoxy group, a butoxy group, and an isobutoxy group), N-methylol (meth)acrylamide, and N-phenyl (meth)acrylamide; glycidyl group-containing monomers such as glycidyl (meth)acrylate and allylglycidyl ether; silane-containing monomers such as (meth)acryloxypropyl trimethoxysilane, (meth)acryloxypropyl triethoxysilane; and isocyanate group-containing monomers such as (meth)acryloxypropyl isocyanate.

As the polyol, the acrylic polyol (a2) is preferable from the viewpoint of excellent electrolytic solution resistance.

The polyol can be used according to the required functions or performance, and may be used alone or in combination of two or more kinds thereof. By using these polyols and aliphatic isocyanate curing agents, a base material protective layer 17 formed from the polyurethane resin is obtained.

In the second embodiment of the present invention, the same aliphatic isocyanate curing agent as in the first embodiment can be used.

The aliphatic isocyanate curing agent is a bifunctional or higher isocyanate compound having no aromatic ring. The aliphatic isocyanate curing agent is suitable for the outermost layer since it does not have an aromatic ring, and as a result, a benzene ring does not becomes a quinoid by ultraviolet rays and yellowing is inhibited. Examples of the aliphatic isocyanate curing agent include methylene diisocyanate, isopropylene diisocyanate, lysine diisocyanate, 2,2,4- or 2,4,4-trimethyl hexamethylene diisocyanate, 1,6-hexamethylene diisocyanate, methylcyclohexane diisocyanate, isophorone diisocyanate, 4,4'-dicyclohexylmethane diisocyanate, and isopropylidene dicyclohexyl-4,4'-diisocyanate. Furthermore, adduct forms, biuret forms, or isocyanurate forms of the isocyanate compounds may also be used.

As the aliphatic isocyanate curing agent, 1,6-hexamethylene diisocyanate and isophorone diisocyanate are preferable from the viewpoint of improved electrolytic solution resistance. In addition to the improvement of self-repairing performance of a curing agent, with regard to the reactivity of the aliphatic isocyanate curing agent with a hydroxyl group of the polyol, the reactivity of 1,6-hexamethylene diisocyanate with a hydroxyl group of the polyol is higher than the reactivity of the isophorone diisocyanate with a hydroxyl group of the polyol, and therefore, taking mass production into consideration, 1,6-hexamethylene diisocyanate is particularly preferable.

The molar ratio (NCO/OH) of the isocyanate groups contained in the aliphatic isocyanate curing agent to the hydroxyl groups contained in the polyol in the urethane resin (A) is preferably from 0.5 to 50, and more preferably 1 to 20. In the case where the molar ratio (NCO/OH) is a lower limit (0.5) or more, the scratch resistance and the electrolytic solution resistance are improved. In the case where the molar ratio (NCO/OH) is an upper limit (50) or less, the adhesiveness with the base material can be easily ensured.

Furthermore, the glass transition temperature Tg of the urethane resin (A) is 0° C. or higher, and preferably 5° C. or higher from the viewpoint that the scratch resistance by self-repairing property is easily imparted. Furthermore, the glass transition temperature Tg of the urethane resin (A) is 60° C. or lower, preferably 40° C. or lower, and more preferably 20° C. or lower from the viewpoint that the urethane resin is easily inhibited from be brittle as the base material protective layer 17 becomes harder.

In addition, the glass transition temperature Tg of the urethane resin (A) means the peak temperature (heating rate of 5° C./minute) of the loss tangent (tan θ) at 1 Hz in the dynamic viscoelasticity measurement (DMS).

The thickness of the base material protective layer 17 is preferably 1 to 10 μm, and more preferably 1 to 5 μm. In the case where the thickness of the base material protective layer 17 is a lower limit (1 μm) or more, it is easy to obtain excellent electrolytic solution resistance and scratch resistance.

In the case where the thickness of the base material protective layer 17 is an upper limit (10 μm) or less, the base material easily becomes thinner and it is thus easy to obtain stretching performance.

A filler is preferably contained in the base material protective layer 17. If the filler is contained, damage cannot be noticeable even when the damage is generated on the surface of the base material protective layer 17.

Examples of the filler include resin fillers of a polyethylene resin, a polypropylene resin, a phenol resin, an acryl resin, and the like, silica, and graphite. Examples of the shape of the filler include a flake shape, a spherical shape, a hollow shape, a fiber shape, and an amorphous shape. Among these, from the viewpoint that the scratch resistance of the base material protective layer 17 is improved, the resin filler is preferable, and the amorphous resin filler is more preferable.

The content of the filler in the base material protective layer 17 (100% by mass) is preferably 1% by mass or more, and more preferably 3% by mass or more, from the viewpoint that the surface gloss is easily lowered. Furthermore, the content of the filler is preferably 50% by mass or less, and more preferably 30% by mass or less, from the viewpoint that it is easy to prevent the detachment of the filler.

Furthermore, the particle diameter of the filler is preferably 0.8 µm or more, and more preferably 1.0 µm or more, from the viewpoint that the gloss can be further lowered. Furthermore, the particle diameter of the filler means a value measured by a laser diffraction method.

Furthermore, additives such as a flame retardant, a lubricant, an antioxidant, a photostabilizer, a tackifier, a leveling agent, and an antifoaming agent in addition to the filler, may be blended in the base material protective layer 17.

Examples of the lubricant include fatty acid amides such as oleic acid amide, erucic acid amide, stearic acid amide, behenic acid amide, ethylenebisoleic acid amide, and ethylenebiserucic acid amide.

These additives may be used alone or in combination of two or more kinds thereof.

In the second embodiment of the present invention, the outer surface of the base material protective layer 17 is preferably matting-treated. By such a treatment, the sliding property of the surface of the base material protective layer 17 is improved, and thus, it is easy to inhibit the packaging material 1 from being excessively adhered to a mold in cold molding, and thus, to improve moldability. Furthermore, a matting effect is also obtained.

(Base Material Layer 11)

The base material layer 11 serves to impart heat resistance in the sealing step during the preparation of a power storage device to inhibit the generation of pinholes that may occur during molding processing or distribution. In particular, in the case of packaging materials for lithium ion batteries, for example, in large-scale use, abrasion resistance, chemical resistance, insulating properties, or the like can also be imparted.

The base material layer 11 is preferably a resin film formed by a resin having insulating properties. Examples of the resin film include stretched or unstretched films such as a polyester film, a polyamide film, and a polypropylene film. The base material layer 11 may be a monolayer film of these resin films or a laminated film formed by using two or more kinds of these resin films.

As the base material layer 11, the materials of a polyamide film out of the materials as described above are preferable from the viewpoint of excellent moldability. Examples of the polyamide resin that forms the polyamide film include nylon 6, nylon 11, nylon 12, nylon 66, nylon 610, and nylon 612.

Furthermore, it is preferable to carry out a corona treatment on the base material layer 11 from the viewpoint that the adhesion with the base material protective layer 17 is increased to improve the electrolytic solution resistance.

The thickness of the base material layer 11 is preferably 6 to 40 µm, and more preferably 10 to 30 µm. In the case where the thickness of the base material layer 11 is a lower limit (6 µm) or more, pinholes resistance and insulating properties are improved. In the case where the thickness of the base material layer 11 is an upper limit (40 µm) or less, the moldability is improved.

(First Adhesive Layer 12)

The first adhesive layer 12 is formed between the base material layer 11 and the metal foil layer 13. The first adhesive layer 12 has adhesive force required to adhere the base material layer 11 firmly to the metal foil layer 13, and Furthermore, the conformability to protect the metal foil layer 13 from being broken by the base material layer 11 during the cold molding, or the like is also required.

Examples of the first adhesive layer 12 include two-liquid curable polyurethane-based adhesives in which a polyol such as a polyester polyol, a polyether polyol, and an acrylic polyol is used as a primary agent and an aromatic or aliphatic isocyanate is used as a curing agent. The molar ratio (NCO/OH) of the isocyanate groups in the curing agent to the hydroxyl groups in the primary agent is preferably 1 to 10, and more preferably 2 to 5.

The thickness of the first adhesive layer 12 is preferably 1 to 10 µm, and more preferably 2 to 6 µm, from the viewpoint of adhesion strength, processability, or the like, or in order to ensure to form the first adhesive layer 12 on the member without being stripped even when the member provide with the first adhesive layer 12 is modification-stretched (in order to obtain conformability).

(Metal Foil Layer 13)

As the metal foil layer 13, various metal foils such as foils of aluminum and stainless steel can be used, and from the viewpoints of a moisture-proof property, processability such as ductility, and cost, an aluminum foil is preferable.

As the aluminum foil, for example, known soft aluminum foils may be used, and in order to obtain desired pinholes resistance, and ductility during the molding, an aluminum foil containing iron is preferable. The content of iron in the aluminum foil (100% by mass) is preferably 0.1% by mass to 9.0% by mass, and more preferably 0.5% by mass to 2.0% by mass. In the case where the content of iron is a lower limit (0.1% by mass) or more, the pinholes resistance and the ductility are improved. If the content of iron is an upper limit (9.0% by mass) or less, the flexibility is improved.

In addition, as the aluminum foil, a soft aluminum foil which has been subjected to an annealing treatment is preferable in order to impart desired ductility in molding.

The thickness of the metal foil layer 13 is preferably 9 to 200 µm, and more preferably 15 to 150 µm, in order to obtain desired barrier properties, pinholes resistance, and processability.

A particularly preferable metal foil layer 13 is a soft aluminum foil having a thickness of 15 to 150 µm, which has been subjected to an annealing treatment. Specifically, Materials 8021 and 8079 in JIS standard are preferable.

The aluminum foil used as the metal foil layer 13 is preferably one which has been subjected to a degreasing treatment, in order to obtain desired electrolytic solution resistance. Furthermore, an aluminum foil having a surface not etched is preferable in order to simplify the preparation step.

The degreasing treatments are largely classified into a wet type degreasing treatment and a dry type degreasing treatment, and in order to simplify the preparation step, the dry type degreasing treatment is preferable.

Examples of the dry type degreasing treatment include a method in which a degreasing treatment is carried out by elongating the treatment time in a step of subjecting an aluminum foil to an annealing treatment. A sufficient electrolytic solution resistance can be obtained even using the degreasing treatment carried out at the same time as the annealing treatment is carried out to soften the aluminum foil. Furthermore, in addition to the degreasing treatment, a frame treatment, a corona treatment, and the like may be included. In addition, it is possible to adopt a degreasing treatment in which contaminants are oxidatively decomposed and removed by active oxygen generated by irradiation with ultraviolet rays at a specific wavelength.

Examples of the wet type degreasing treatment include acid degreasing and alkali degreasing.

Examples of the acid used for the acid degreasing include inorganic acids such as sulfuric acid, nitric acid, hydrochloric acid, and hydrofluoric acid. These acids may be used alone or in combination of two or more kinds thereof. Examples of the alkali used for the alkali degreasing include sodium hydroxide having a high etching effect. Furthermore, materials in which a weakly alkaline system or a surfactant is blended may be included.

The wet type degreasing treatment is carried out by a dipping method or a spraying method.

(Corrosion Prevention-Treated Layer 14)

The corrosion prevention-treated layer 14 serves to adhere the metal foil layer 13 firmly to the second adhesive layer 15, and to protect the metal foil layer 13 from an electrolytic solution or hydrofluoric acid generated from the electrolytic solution.

The corrosion prevention-treated layer 14 is formed, for example, by a hydrothermal modification treatment, an anodic oxidation treatment, a chemical conversion treatment, or a combination of these treatments.

Examples of the hydrothermal modification treatment include a boehmite treatment in which an aluminum foil is dip-treated in boiling water to which triethanolamine has been added. Examples of the anodic oxidation treatment include an alumite treatment. Examples of the chemical conversion treatment include a chromate treatment, a zirconium treatment, a titanium treatment, a vanadium treatment, a molybdenum treatment, a calcium phosphate treatment, a strontium hydroxide treatment, a cerium treatment, a ruthenium treatment, or various chemical conversion treatments formed with a mixed layer thereof. Furthermore, these chemical conversion treatments are not limited to the wet type of treatments, and a method in which these treatment agents are mixed with a resin component and can also be applied.

As described above, among these corrosion prevention treatments, a coating type chromate treatment is preferable from the viewpoint of achieving maximization of the curing and treatment of the waste liquid.

Moreover, the corrosion prevention-treated layer 14 may also be formed only by a pure coating technique, in addition to the above-described chemical conversion treatments. Examples of such a method include a method using a sol of oxides of rare earth elements such as cerium oxide, having an average particle diameter of 100 nm or less, as a material which has a corrosion prevention effect (inhibitor effect) of aluminum and is suitable in an environmental aspect. By using this method, it is possible to impart a metal foil corrosion prevention effect of an aluminum foil or the like even using a general coating method.

(Second Adhesive Layer 15)

The second adhesive layer 15 is a layer in which the corrosion prevention-treated layer 14 and the sealant layer 16 are adhered to each other. The packaging material 1 is largely classified into one having a heat laminate configuration and one having a dry laminate configuration according to the kind of the second adhesive layer 15.

In the case of the dry laminate configuration, it is possible to use the same adhesive as those mentioned as the first adhesive layer 12 as a component that forms the second adhesive layer 15. In this case, in order to inhibit the swelling due to the electrolytic solution or hydrolysis by hydrofluoric acid, the adhesive used needs to be subjected to composition design, for example, of using a primary agent having a skeleton which is difficult to hydrolyze, or of enhancing the crosslinking density.

Examples of the technique for enhancing the crosslinking density include a method using a dimeric fatty acid, an ester or a hydrogenated product of the dimeric fatty acid, a reduced glycol of the dimeric fatty acid, or a reduced glycol of an ester or a hydrogenated product of the dimeric fatty acid. The dimeric fatty acid is an acid formed by dimerizing various unsaturated fatty acids, and examples of the structure thereof include non-cyclic, monocyclic, polycyclic, and aromatic cyclic structures. The polybasic acid, which is a raw material of the polyester polyol used as an adhesive that forms the second adhesive layer 15, is not particularly limited. Furthermore, the fatty acid, which is a starting material of the dimeric fatty acid, is not particularly limited. In addition, a dibasic acid used in common polyester polyols may be incorporated, using such a dimeric fatty acid as an essential component.

It is possible to use an isocyanate compound, which can be used as a chain elongation agent for the polyester polyol, as a curing agent for the primary agent. In this case, the crosslinking density of the adhesive coating film is enhanced and correspondingly, the dissolution or swelling properties are improved, and the concentration of urethane groups is increased. Therefore, it is expected to improve the adhesiveness to a base material.

In the case of the heat laminate configuration, as a component that forms the second adhesive layer 15, an acid-modified polyolefin-based resin formed by the graft-modification of a polyolefin-based resin with an acid is preferable. Examples of the polyolefin-based resin include low-density polyethylene, medium-density polyethylene, and high-density polyethylene; ethylene-α-olefin copolymers; homo, block, or random polypropylenes; and propylene-α-olefin copolymers. The polyolefin-based resins may be used alone or in combination of two or more kinds thereof. Examples of the graft-modification acid include carboxylic acid, an epoxy compound, and an acid anhydride, and maleic anhydride is preferable.

As the component that constitutes the second adhesive layer 15, a maleic anhydride-modified polyolefin-based resin formed by the graft-modification of a polyolefin-based resin with maleic anhydride is preferable, and a maleic anhydride-modified polypropylene is particularly preferable, in order to facilitate to maintain the adhesive force between the sealant layer 16 and the metal foil layer 13 even when the electrolytic solution penetrates thereinto.

In the case where the second adhesive layer 15 is formed by extrusion molding, it is easy to align the adhesive resin in the MD direction (machine direction) with the stress generated during the extrusion molding. In this case, in order to reduce the anisotropy of the second adhesive layer 15, an elastomer may be blended in the second adhesive layer 15.

Examples of the elastomer blended in the second adhesive layer 15 include olefin-based elastomers and styrene-based elastomers. The average particle diameter of the blended elastomer is preferably 200 nm or less in order to improve the compatibility between the elastomer and the adhesive resin and the effect of reducing the anisotropy of the second adhesive layer 15. Furthermore, the average particle diameter is measured by photographing an enlarged cross-section of the elastomer composition by an electron microscope, and measuring the average particle diameter of the cross-linked rubber components dispersed by image analysis.

These elastomers may be used alone or in combination of two or more kinds thereof.

In the case where the elastomer is blended in the second adhesive layer 15, the blending amount of the elastomer in the second adhesive layer 15 (100% by mass) is preferably 1% by mass to 25% by mass, and more preferably 10% by mass to 20% by mass. In the case where the blending amount of the elastomer is a lower limit (1% by mass) or more, the compatibility with the adhesive resin is improved, and the effect of reducing the anisotropy of the second adhesive layer 15 is improved. In the case where the blending amount of the elastomer is an upper limit (25% by mass) or less, it is easy to inhibit the second adhesive layer 15 from being swollen by the electrolytic solution.

The second adhesive layer 15 may be formed by using a dispersion type of an adhesive resin solution in which the adhesive resin is dispersed in an organic solvent.

The thickness of the second adhesive layer 15 is preferably 1 to 40 μm, and more preferably 5 to 20 μm.

(Sealant Layer 16)

The sealant layer 16 is the inner layer of the packaging material 1, which is a layer thermally welded during the assembly to a battery. That is, the sealant layer 16 is a layer including a thermally weldable film.

Examples of the component of the film constituting the sealant layer 16 include a polyolefin-based resin, and an acid-modified polyolefin-based resin formed by the graft-modification of the polyolefin-based resin with maleic anhydride or the like. Among these, the polyolefin-based resin is preferable, and the polypropylene is particularly preferable, in order to improve the water vapor barrier properties, and thus form a battery form without excessive collapse by heat sealing. Examples of the polypropylene include the polypropylene exemplified in the second adhesive layer 15.

The sealant layer 16 may be formed from a film having a mixture of various resins as described above.

The sealant layer 16 may be a monolayer film or a multilayer film.

In the case of using a film formed by extrusion molding, since the sealant layer 16 tends to be aligned in the extrusion direction of the film, an elastomer may be blended in the sealant layer 16 in order to reduce the anisotropy of the sealant layer 16 by the alignment. By providing this, it becomes easy to inhibit the sealant layer 16 from being whitened when the packaging material 1 is subjected to cold molding to form a concave portion.

As the elastomer to be blended in the sealant layer 16, the same materials as the materials mentioned as the elastomer blended in the second adhesive layer 15 can be used, and the preferable materials are also the same.

In the case where the sealant layer 16 is a laminated film, the elastomer may be blended in a certain layer or all the layers out of the layers. For example, in the case where the sealant layer 16 has a trilayer configuration of random polypropylene/block polypropylene/random polypropylene, the elastomer may be blended in only the layer of block polypropylene, only the layer of random polypropylene, or both of the layer of random polypropylene and the layer of block polypropylene.

Moreover, a lubricant may be blended in the sealant layer 16 for the purpose of imparting a sliding property. By providing this, when the packaging material 1 is subjected to cold molding to form a concave portion, it becomes easy to prevent the portion which becomes a side or angle of the concave portion having a high stretching rate in the packaging material 1 from being stretched more than necessary. As a result, it becomes easy to inhibit the stripping between the metal foil layer 13 and the second adhesive layer 15, or the breakage or whitening due to cracks in the sealant layer 16 and the second adhesive layer 15.

In the case where the lubricant is blended in the sealant layer 16, the blending amount of the lubricant in the sealant layer 16 (100% by mass) is preferably 0.001% by mass to 0.5% by mass. In the case where the blending amount of the lubricant is 0.001% by mass or more, it is easy to obtain an effect of inhibiting the sealant layer 16 from being whitened during the cold molding. In the case where the blending amount of the lubricant is 0.5% by mass or less, it becomes easy to inhibit reduction of the adhesion strength due to the bleeding of the lubricant on the laminate surface (laminated surface) of other layers of the packaging material 1 from the sealant layer.

The method for preparing the packaging material 1 in the second embodiment of the present invention is the same method (steps (I) to (IV)) as the method for preparing the packaging material 1 in the first embodiment of the present invention, and accordingly, the description will be omitted hereinafter.

The packaging material in the second embodiment of the present invention as described above has a base material protective layer laminated on the outer surface of the base material layer, and thus has excellent electrolytic solution resistance. Therefore, even when an electrolytic solution is adhered to the surface on the side of the base material layer in the packaging material, deterioration of the base material layer and the side of the base material layer in the metal foil layer can be inhibited. The base material protective layer in the packaging material in the second embodiment of the present invention is formed from a urethane resin (A) formed of a specific polyol and a curing agent, unlike the matte varnish layer of the above-described packaging material in the related art, and thus, it is thought to obtain excellent electrolytic solution resistance. The reason why the effect is obtained by the urethane resin (A) having such a specific configuration is not necessarily clear, but is thought to be as follows. It is thought that by using the polyester polyol (a1) or the acrylic polyol (a2), each having hydroxyl groups at least at a site other than the end, instead of polyether polyols having hydroxy groups arranged only at the end of the main chain, the crosslinking points increase and the electrolytic solution resistance is improved. Particularly, it is thought since the acrylic polyol (a2) has groups having hydroxyl groups arranged randomly as a side chain with respect to the main chain, the crosslinking points increase and the electrolytic solution resistance is improved.

In addition, with the packaging material in the second embodiment of the present invention, excellent electrolytic solution resistance is obtained, and Furthermore, since the glass transition temperature Tg of the urethane resin (A) that forms a base material protective layer is 0° C. to 60° C., excellent scratch resistance is obtained.

Moreover, the packaging material in the second embodiment of the present invention is not limited to the packaging material 1. For example, a corrosion prevention-treated layer may be formed on both sides of the metal foil layer. In the case where the corrosion prevention-treated layer is formed on the side of the base material layer in the metal foil layer, it becomes easier to inhibit the corrosion of the side of the base material layer in the metal foil layer with the electrolytic solution.

Third Embodiment

Hereinafter, a third embodiment of the present invention will be described.

The packaging material for a power storage device in the third embodiment of the present invention includes at least a first adhesive layer, a metal foil layer, a corrosion prevention-treated layer, a second adhesive layer, and a sealant layer, which are sequentially laminated on the first surface of a base material layer; and a laminated film including a polyamide film having a thickness of 6 to 40 μm and a polyester film, the polyamide film and the polyester film being sequentially laminated on the second surface of the base material layer, and has irregularities (irregular portions) formed on the outer surface of the laminated film.

Hereinafter, one example of the packaging material for a power storage device in the third embodiment of the present invention is shown and described in detail.

Figure 2:
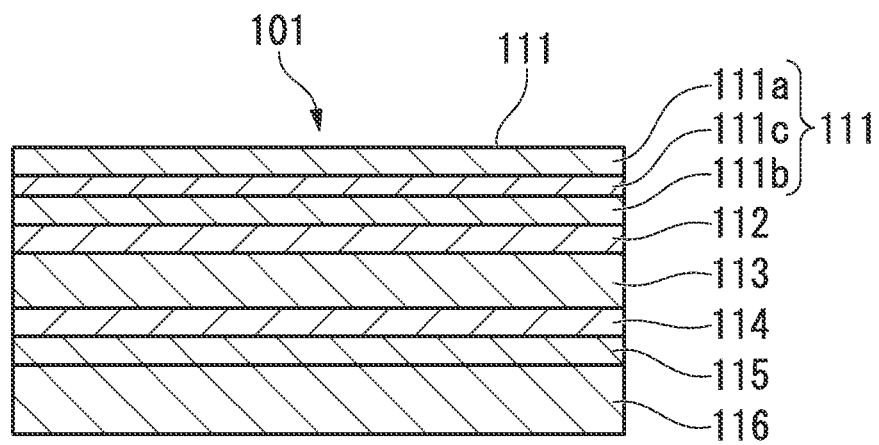
FIG. 2 is a cross-sectional view showing one example of the packaging material for a power storage device of the present invention.

The packaging material 101 for a power storage device of the present embodiment (hereinafter sometimes simply referred to as an "packaging material 101") is a laminate in which the first adhesive layer 112, the metal foil layer 113, the corrosion prevention-treated layer 114, the second adhesive layer 115, and the sealant layer 116 are sequentially laminated on the first surface of the base material layer 111, as shown in FIG. 2. The packaging material 101 is used such that the base material layer 111 becomes an outermost layer and the sealant layer 116 becomes an innermost layer.

(Base Material Layer 111)

The base material layer 111 shown in the third embodiment of the present invention serves to impart heat resistance in the sealing step for the packaging material 101 during the preparation of a power storage device, thereby inhibiting the generation of pinholes that may occur during molding processing or distribution. Furthermore, it imparts the electrolytic solution resistance to inhibit the generation of poor appearance in the case where the electrolytic solution is adhered in the electrolytic solution-injecting step during the preparation of the power storage device.

The base material layer 111 is a layer including a laminated film in which a polyamide film 111b and a polyester film 111a are sequentially laminated on the second surface of the base material layer 111.

The polyester film 111a and the polyamide film 111b are laminated by the adhesion through a third adhesive layer 111c.

The base material layer 111 has the polyester film 111a on the outermost layer. By providing this, a packaging material 101 having excellent electrolytic solution resistance and scratch resistance is obtained. From the viewpoint that the polyester film 111a is crystallized by aligning the molecules by stretching biaxially in X and Y axes after formation of a film to impart strength and heat resistance, a stretched polyester film is preferable, and a biaxially stretched polyester film is more preferable. However, the polyester film 111a may be an unstretched polyester film.

Examples of the polyester resin that forms the polyester film 111a include polyethylene terephthalate and polyethylene naphthalate.

From the viewpoint that the electrolytic solution resistance and the scratch resistance are improved, the thickness of the polyester film 111a is preferably 1 μm or more, and more preferably 3 μm or more. Furthermore, from the viewpoint that the moldability is improved, the thickness of the polyester film 111a is preferably 20 μm or less, and more preferably 15 μm or less.

Furthermore, the base material layer 111 has the polyamide film 111b on the inner side of the polyester film 111a. By providing this, excellent moldability is obtained. The polyamide film 111b may be either an unstretched film or a stretched film. As the polyamide film 111b, a stretched polyamide film is preferable, and a biaxially stretched polyamide film is more preferable, from the viewpoint that the strength is improved by stretching.

Examples of the polyamide resin that forms the polyamide film include nylon 6, nylon 11, nylon 12, nylon 66, nylon 610, and nylon 612.

The thickness of the polyamide film 111b is preferably 6 μm or more, and more preferably 10 μm or more, from the viewpoint that excellent moldability, pinholes resistance, insulating properties are obtained. Furthermore, the thickness of the polyamide film 111b is preferably 40 μm or less, and more preferably 30 μm or less, from the viewpoint that excellent moldability is obtained.

In order to improve the adhesiveness between the polyester film 111a and the polyamide film 111b, the films are preferably laminated by a dry laminate method. In this case, as an adhesive component that forms the third adhesive layer 111c, an adhesive for dry laminate is preferable.

As the adhesive for dry laminate, a two-liquid curable polyurethane-based adhesive obtained by allowing a bifunctional or higher aromatic or aliphatic isocyanate as a curing agent to act on a primary agent such as a polyester polyol, a polyether polyol, and an acrylic polyol is preferable. After the polyurethane-based adhesive is coated and then aged, for example, at 40° C. for 4 days or longer, to proceed the reaction between the hydroxyl groups of the primary agent and the isocyanate groups in the curing agent, which allows firm adhesion. The molar ratio (NCO/OH) of the isocyanate groups in the curing agent to the hydroxyl groups of the primary agent in the aforementioned polyurethane-based adhesive is preferably 1 to 10, and more preferably 2 to 5.

Moreover, in order to reduce the cost, the polyester film 111a and the polyamide film 111b are preferably laminated by a co-extrusion method. In this case, as an adhesive component that forms the third adhesive layer 111c, an adhesive resin that is a thermoplastic material is preferable. Examples of the adhesive resin include acid-modified polyolefin-based resins modified by subjecting an acid to graft-copolymerization with a polyolefin-based resin.

Examples of the polyolefin-based resin in the acid-modified polyolefin-based resin include polymers such as low-density polyethylene, medium-density polyethylene, and high-density polyethylene; ethylene-α-olefin copolymers; homo, block, or random polypropylenes; propylene-α-olefin copolymers; copolymers formed by subjecting the compound to copolymerization with polar molecules such as acrylic acid and methacrylic acid; and cross-linked polyolefins. The polyolefin-based resins may be used alone or in combination of two or more kinds thereof.

Examples of the acid used for modification include carboxylic acid or an anhydride thereof, and an epoxy compound, and maleic anhydride is preferable.

Furthermore, irregularities (irregular portions) are formed on the outer surface 111d of the base material layer 111, that is, the outer surface 111d of the polyester film 111a. By providing this, as compared with a case where irregularities are not formed on the outer surface, when the packaging material 101 is deep-drawn by cold molding, the contact area between the mold surface and the outer surface 111d of the base material layer 111 substantially decreases, and thus excessive adhesion between the mold and the packaging material 101 is inhibited. Therefore, the sliding property of the packaging material 101 is sufficiently obtained in cold molding, a specific portion of the packaging material 101 is locally stretched, and thus, generation of defects such as cracks and pinholes is inhibited. As such, with the packaging material 101, excellent moldability as well as excellent electrolytic solution resistance and scratch resistance are obtained.

The irregularities formed on the outer surface 111d of the base material layer 11 are formed such that the static friction coefficient of the outer surface 111d is preferably 0.4 or less, and more preferably 0.3 or less, from the viewpoint that the moldability is improved.

For reference, the term "static friction coefficient" used in the present invention means a value measured by a gradient method (JIS P8147).

The method for forming irregularities (irregular portion) on the outer surface 111d of the base material layer 111 is not particularly limited, and examples thereof include a method using an emboss roll, a method of blending the polyester film 111a with a filler, and a sand blast method.

(First Adhesive Layer 112)

The first adhesive layer 112 is formed between the base material layer 111 and the metal foil layer 13. The first adhesive layer 112 has adhesive force required to adhere the base material layer 111 firmly to the metal foil layer 13, and Furthermore, the conformability to protect the metal foil layer 13 from being broken by the base material layer 111 in cold molding, and the like are also required.

Examples of the first adhesive layer 112 include two-liquid curable polyurethane-based adhesives in which a polyol such as a polyester polyol, a polyether polyol, and an acrylic polyol is used as a primary agent and an aromatic or aliphatic isocyanate is used as a curing agent. The molar ratio (NCO/OH) of the isocyanate groups in the curing agent to the hydroxyl groups in the primary agent is preferably 1 to 10, and more preferably 2 to 5.

The thickness of the first adhesive layer 112 is preferably 1 to 10 μm, and more preferably 2 to 6 μm, to obtain desired adhesion strength, conformability, processability, or the like.

(Metal Foil Layer 113)

As the metal foil layer 113, various metal foils such as foils of aluminum and stainless steel can be used, and from the viewpoints of a moisture-proof property, processability such as ductility, and cost, an aluminum foil is preferable.

As the aluminum foil, for example, known soft aluminum foils may be used, and in order to obtain desired pinholes resistance, and ductility during the molding, an iron-containing aluminum foil is preferable. The content of iron in the aluminum foil (100% by mass) is preferably 0.1% by mass to 9.0% by mass, and more preferably 0.5% by mass to 2.0% by mass. In the case where the content of iron is a lower limit (0.1% by mass) or more, the pinholes resistance and the ductility are improved. If the content of iron is an upper limit (9.0% by mass) or less, the flexibility is improved.

In addition, as the aluminum foil, a soft aluminum foil which has been subjected to an annealing treatment is preferable in order to impart desired ductility in molding.

The thickness of the metal foil layer 113 is preferably 9 to 200 μm, and more preferably 15 to 150 μm, in order to obtain desired barrier properties, pinholes resistance, and processability.

In particular, a preferred metal foil layer 113 is a soft aluminum foil having a thickness of 15 to 150 μm, which has been subjected to an annealing treatment. Specifically, Materials 8021 and 8079 in JIS standard are preferable.

The aluminum foil used in the metal foil layer 113 is preferably one which has been subjected to a degreasing treatment, in order to obtain desired electrolytic solution resistance. Furthermore, an aluminum foil in which the surface has not been etched is preferable, in order to simplify the preparation step.

The degreasing treatments are largely classified into a wet type degreasing treatment and a dry type degreasing treatment, and in order to simplify the preparation step, the dry type degreasing treatment is preferable.

Examples of the dry type degreasing treatment include a method in which a degreasing treatment is carried out by elongating the treatment time in a step of subjecting an aluminum foil to an annealing treatment. A sufficient electrolytic solution resistance can be obtained even using the degreasing treatment carried out at the same time as the annealing treatment is carried out to soften the aluminum foil. Furthermore, in addition to the degreasing treatment, a frame treatment, a corona treatment, and the like may be included. In addition, it is possible to adopt a degreasing treatment in which contaminants are oxidatively decomposed and removed by active oxygen generated by irradiation with ultraviolet rays at a specific wavelength.

Examples of the wet type degreasing treatment include acid degreasing and alkali degreasing.

Examples of the acid used for the acid degreasing include inorganic acids such as sulfuric acid, nitric acid, hydrochloric acid, and hydrofluoric acid. These acids may be used alone or in combination of two or more kinds thereof. Examples of the alkali used for the alkali degreasing include sodium hydroxide having a high etching effect. Furthermore, materials in which a weakly alkaline system or a surfactant is blended may be included.

The wet type degreasing treatment is carried out by a dipping method or a spraying method.

(Corrosion Prevention-Treated Layer 114)

The corrosion prevention-treated layer 114 serves to adhere the metal foil layer 113 firmly to the second adhesive layer 115, and to protect the metal foil layer 113 from an electrolytic solution or hydrofluoric acid generated from the electrolytic solution.

The corrosion prevention-treated layer 114 is formed on the metal foil layer 113, for example, by carrying out a hydrothermal modification treatment, an anodic oxidation treatment, a chemical conversion treatment, or a combination of these treatments on the metal foil layer 113.

Examples of the layer formed by the hydrothermal modification treatment include a layer formed by a boehmite treatment in which the metal foil layer 113 is dipped in boiling water to which triethanolamine has been added. Examples of the layer formed by the anodic oxidation treatment include a layer formed by an alumite treatment. Examples of the layer formed by the chemical conversion treatment include layers formed by a chromate treatment, a zirconium treatment, a titanium treatment, a vanadium treatment, a molybdenum treatment, a calcium phosphate treatment, a strontium hydroxide treatment, a cerium treatment, a ruthenium treatment, or a combination of these treatments. Furthermore, these chemical conversion treatments are not limited to the layers formed by the wet type chemical conversion treatments, and examples thereof include a layer by a coating-type chromate treatment using a coating-type treatment agent formed by mixing the treatment agents used in the chemical conversion treatment with a resin component.

Among these, the layer formed by the coating type chromate treatment is preferable from the viewpoint that the effect is maximized and the treatment of the waste liquid is advantageous.

Moreover, the corrosion prevention-treated layer 114 may be a layer formed only by a pure coating technique, in addition to the above-described layer formed by the chemical conversion treatments. Specifically, the corrosion prevention-treated layer 114 may be layer formed by coating a treatment liquid including a sol of oxides of rare earth elements such as cerium oxide, having an average particle diameter of 100 nm or less as a material which has a corrosion prevention effect (inhibitor effect) of aluminum and is suitable in an environmental aspect, followed by drying.

(Second Adhesive Layer 115)

The second adhesive layer 115 is a layer in which the corrosion prevention-treated layer 114 and the sealant layer 116 are adhered together. The packaging material 101 can be classified into one having a heat laminate configuration and one having a dry laminate configuration according to the kind of the second adhesive layer 115.

In the case of the dry laminate configuration, it is possible to use the same adhesive as those mentioned as the first adhesive layer 112 as a component that forms the second adhesive layer 115. In this case, in order to inhibit a swelling due to the electrolytic solution or hydrolysis by hydrofluoric acid, the adhesive used needs to be subjected to composition design, for example, of using a primary agent having a skeleton which is difficult to hydrolyze, or of enhancing the crosslinking density.

Examples of the technique for enhancing the crosslinking density include a method using a dimeric fatty acid, an ester or a hydrogenated product of the dimeric fatty acid, a reduced glycol of the dimeric fatty acid, or a reduced glycol of an ester or a hydrogenated product of the dimeric fatty acid. The dimeric fatty acid is an acid formed by dimerizing various unsaturated fatty acids, and examples of the structure thereof include non-cyclic, monocyclic, polycyclic, and aromatic cyclic structures. The polybasic acid, which is a raw material of the polyester polyol used as an adhesive that forms the second adhesive layer 115, is not particularly limited. Furthermore, the fatty acid, which is a starting material of the dimeric fatty acid, is also not particularly limited. In addition, a dibasic acid used in common polyester polyols may be incorporated, using such a dimeric fatty acid as an essential component.

It is possible to use an isocyanate compound, which can be used as a chain elongation agent for the polyester polyol, as a curing agent for the primary agent. In this case, the crosslinking density of the adhesive coating film is enhanced and correspondingly, the dissolution or swelling properties are improved, and the concentration of urethane groups is increased. Therefore, it is expected to improve the adhesiveness to a base material.

In the case of the heat laminate configuration, as a component that forms the second adhesive layer 115, an acid-modified polyolefin-based resin formed by the graft-modification of a polyolefin-based resin with an acid is preferable. Examples of the polyolefin-based resin include low-density polyethylene, medium-density polyethylene, and high-density polyethylene; ethylene-α-olefin copolymers; homo, block, or random polypropylenes; and propylene-α-olefin copolymers. The polyolefin-based resins may be used alone or in combination of two or more kinds thereof. Examples of the graft-modification acid include carboxylic acid, an epoxy compound, and an acid anhydride, and maleic anhydride is preferable.

As the component that constitutes the second adhesive layer 115, a maleic anhydride-modified polyolefin-based resin formed by the graft-modification of a polyolefin-based resin with maleic anhydride is preferable, and a maleic anhydride-modified polypropylene is particularly preferable, in order to facilitate to maintain the adhesive force between the sealant layer 116 and the metal foil layer 113 even when the electrolytic solution penetrates thereinto.

In the case where the second adhesive layer 115 is formed by extrusion molding, it is easy to align the adhesive resin in the MD direction (machine direction) with the stress generated during the extrusion molding. In this case, in order to reduce the anisotropy of the adhesive resin, an elastomer may be blended in the second adhesive layer 115.

Examples of the elastomer blended in the second adhesive layer 115 include olefin-based elastomers and styrene-based elastomers. The average particle diameter of the blended elastomer is preferably 200 nm or less in order to improve the compatibility between the elastomer and the adhesive resin and the effect of reducing the anisotropy of the second adhesive layer 115. Furthermore, the average particle diameter is measured by photographing an enlarged cross-section of the elastomer composition by an electron microscope, and measuring the average particle diameter of the cross-linked rubber components dispersed by image analysis.

These elastomers may be used alone or in combination of two or more kinds thereof.

In the case where the elastomer is blended in the second adhesive layer 115, the blending amount of the elastomer in the second adhesive layer 115 (100% by mass) is preferably 1% by mass to 25% by mass, and more preferably 10% by mass to 20% by mass. In the case where the blending amount of the elastomer is a lower limit (1% by mass) or more, the compatibility with the adhesive resin is improved, and the effect of reducing the anisotropy of the second adhesive layer 115 is improved. In the case where the blending amount of the elastomer is an upper limit (25% by mass) or less, it is easy to inhibit the second adhesive layer 115 from being swollen by the electrolytic solution.

The second adhesive layer 115 may be formed by using a dispersion type of an adhesive resin solution in which the adhesive resin is dispersed in an organic solvent.

The thickness of the second adhesive layer 115 is preferably 1 to 40 μm, and more preferably 5 to 20 μm.

(Sealant Layer 116)

The sealant layer 116 is the inner layer of the packaging material 101, which is a layer thermally welded during the battery assembly. That is, the sealant layer 116 is a layer including a thermally weldable film.

Examples of the component of the film constituting the sealant layer 116 include a polyolefin-based resin, and an acid-modified polyolefin-based resin formed by the graft-modification of the polyolefin-based resin with maleic anhydride or the like. Among these, a polyolefin-based resin is preferable, and polypropylene is particularly preferable, in order to improve the water vapor barrier properties, and thus form a battery form without excessive collapse by heat sealing. Examples of the polypropylene include the polypropylene exemplified in the second adhesive layer 115.

The sealant layer 116 may be formed from a film having a mixture of various resins as described above.

The sealant layer 116 may be a monolayer film or a multilayer film.

In the case of using a film formed by extrusion molding, since the sealant layer 116 tends to be aligned in the extrusion direction of the film, an elastomer may be blended in the sealant layer 116 in order to reduce the anisotropy of the sealant layer 116 by the alignment. By providing this, it becomes easy to inhibit the sealant layer 116 from being whitened when the packaging material 101 is subjected to cold molding to form a concave portion.

As the elastomer blended in the sealant layer 116, the same materials as the materials mentioned as the elastomer blended in the second adhesive layer 115 can be used, and the preferable materials are also the same.

In the case where the sealant layer 116 is a laminated film, the elastomer may be blended in a certain layer or all the layers out of the layers. For example, in the case where the sealant layer 116 has a trilayer configuration of random polypropylene/block polypropylene/random polypropylene, the elastomer may be blended in only the layer of block polypropylene, only the layer of random polypropylene, or both of the layer of random polypropylene and the layer of block polypropylene.

Moreover, a lubricant may be blended in the sealant layer 116 for the purpose of imparting a sliding property. By providing this, when the packaging material 101 is subjected to cold molding to form a concave portion, it becomes easy to prevent the portion which is a side or angle of the concave portion having a high stretching rate in the packaging material 101 from being stretched more than necessary. As a result, it becomes easy to inhibit the stripping between the metal foil layer 113 and the second adhesive layer 115, or the breakage or whitening due to cracks in the sealant layer 116 and the second adhesive layer 115.

In the case where the lubricant is blended in the sealant layer 116, the blending amount of the lubricant in the sealant layer 116 (100% by mass) is preferably 0.001% by mass to 0.5% by mass. In the case where the blending amount of the lubricant is 0.001% by mass or more, it is easy to obtain an effect of inhibiting the sealant layer 116 from being whitened during the cold molding. In the case where the blending amount of the lubricant is 0.5% by mass or less, the lubricant bleeds on the laminate surface (laminated surface) of other layers of the packaging material 101 from the sealant layer, and it is thus easy to inhibit reduction of the adhesion strength.

(Preparation Method)

Hereinafter, the method for preparing the packaging material 101 will be described. However, the method for preparing the packaging material 101 is not limited to the methods described below.

Examples of the method for preparing the packaging material 101 include a method including the following steps (I) to (III).

(I) A step of forming the corrosion prevention-treated layer 114 on the metal foil layer 113.

(II) A step of bonding the base material layer 111, through the first adhesive layer 112, onto the surface opposite to the surface on which the corrosion prevention-treated layer 114 in the metal foil layer 113 is formed.

(III) A step of bonding the sealant layer 116, through the second adhesive layer 115, onto the side of the corrosion prevention-treated layer 114 of the metal foil layer 113.

Step (I):

The corrosion prevention-treated layer 114 is formed, for example, by coating a corrosion prevention treatment agent, followed by drying, curing, and baking, on one surface of the metal foil layer 113. Examples of the corrosion prevention treatment agent include a corrosion prevention treatment agent for a coating type chromate treatment.

The method for coating the corrosion prevention treatment agent is not particularly limited, and examples thereof include gravure coating, gravure reverse coating, roll coating, reverse roll coating, die coating, bar coating, kiss coating, and comma coating.

In addition, an unreacted metal foil may be used in the metal foil layer 113, and a metal foil which has been subjected to a degreasing treatment by a wet type or dry type of a degreasing treatment may also be used.

Step (II):

The base material layer 111 is bonded on the surface opposite to the surface on which the corrosion prevention-treated layer 114 in the metal foil layer 113 is formed, using an adhesive for forming the first adhesive layer 112.

Examples of the method for bonding include techniques of dry laminate, non-solvent lamination, wet lamination, and the like.

In the step (II), an aging treatment in the range from room temperature to 100° C. may be carried out in order to promote the adhesiveness.

Step (III):

The sealant layer 116 is bonded, through the second adhesive layer 115, on the side of the corrosion prevention-treated layer 114 of the laminate in which the base material layer 111, the first adhesive layer 112, the metal foil layer 113, and the corrosion prevention-treated layer 114 are laminated in this order.

In the case of the dry laminate configuration, the sealant layer 116 is bonded on the side of the corrosion prevention-treated layer 114 of the laminate using the above-described adhesive, with a technique of dry lamination, non-solvent lamination, wet lamination, or the like.

In the case of the heat laminate configuration, for example, the following dry process and wet process may be included. In the case of the dry process, the adhesive resin is extrusion-laminated on the corrosion prevention-treated layer 114 of the laminate to form the second adhesive layer 115. Furthermore, the film that forms the sealant layer 116 is laminated on the second adhesive layer 115. In addition, the film that forms the sealant layer 116 is obtained by an inflation method or a cast method. Thereafter, a heat treatment (aging treatment, heat lamination, or the like) may be carried out for the purpose of improving the adhesion between the corrosion prevention-treated layer 114 and the second adhesive layer 115. Furthermore, a multilayer film in which the second adhesive layer 115 and the sealant layer 116 are laminated by an inflation method or a cast method is fabricated, and by laminating the multilayer film on the laminate by heat lamination, the sealant layer 116 may be laminated through the second adhesive layer 115.

In the case of the wet process, a dispersion type of an adhesive resin solution of an adhesive resin such as an acid-modified polyolefin-based resin is coated on the corrosion prevention-treated layer 114 of the laminate, the solvent is volatilized at a temperature no lower than the melting point of the adhesive resin, and the adhesive resin is melt-softened, and baked. Thereafter, the sealant layer 116 is laminated by heat treatment such as heat lamination.

By the steps (I) to (III) as describe above, the packaging material 101 is obtained.

Furthermore, the method for preparing the packaging material 101 is not limited to the methods in which the steps (I) to (III) are sequentially carried out. For example, the step (I) may be carried out after the step (II). Furthermore, formation of the corrosion prevention-treated layer 114 and extrusion lamination of the sealant layer 116 may be carried out continuously in-line. In addition, a corrosion prevention-treated layer may be provided on both sides of the metal foil layer.

In the packaging material in the third embodiment of the present invention as described above, the base material layer includes a laminated film having a polyester film on the outer side of a polyamide film, and thus, excellent electrolytic solution resistance and scratch resistance are obtained. In addition, when the polyamide film of the base material layer has excellent moldability and irregularities are formed on the outer side of the polyester film on the outer side, excessive adhesion between the mold and the packaging material in cold molding can be inhibited, and thus, excellent moldability is also obtained.

Furthermore, the packaging material in the third embodiment of the present invention is not limited to the packaging material 101. For example, a corrosion prevention-treated layer may be formed on both sides of the metal foil layer. In the case where the corrosion prevention-treated layer is formed on the side of the base material layer in the metal foil layer, it becomes easier to inhibit the corrosion of the side of the base material layer in the metal foil layer with an electrolytic solution.

Examples of the power storage device formed from the packaging material in embodiments of the present invention include power storage devices used in portable terminal devices such as PC and cell phones, video cameras, satellites, submarines, electric vehicles, power-assisted bicycles, or the like. As the power storage device, lithium ion batteries employed in these uses are preferable.

The power storage device is prepared by sealing the contents for a power storage device, such as positive electrodes, separators, negative electrodes, electrolytic solutions, and a tap including a lid and a tab sealant such that a part of the tap is positioned the outside of the power storage device. This power storage device may adopt known forms, except for having the packaging material in embodiments of the present invention.

Examples

Hereinafter, the present invention is described in detail with reference to Examples, but the present invention is not limited to the following description.

In Example 1, the materials shown in the first embodiment of the present invention were used.
<Materials Used>
The materials used in Example 1 are shown below.
[Base Material Layer 11]
Film A-1: Nylon 6 film having a thickness of 25 μm.
[First Adhesive Layer 12]
Adhesive B-1: Polyurethane-based adhesive (product name "A525/A50", manufactured by Mitsui Chemicals Inc.).
[Metal Foil Layer 13]
Metal foil C-1: Soft aluminum foil, Material 8079 (manufactured by Toyo Aluminum K. K., thickness of 40 μm).
[Corrosion Prevention-Treated Layer 14]
Treatment agent D-1: "Sodium polyphosphate-stabilized cerium oxide sol" adjusted to a solid concentration of 10% by mass, using distilled water as the solvent. The amount of phosphate was set to 10 parts by weight with respect to 100 parts by weight of cerium oxide.
[Second Adhesive Layer 15]
Adhesive Resin E-1: Maleic anhydride-modified polypropylene.
[Sealant Layer 16]
Film F-1: Polyolefin film having a thickness of 40 μm.
[Base Material Protective Layer 17]
Coating liquid G-1: Coating liquid in which ACRYDIC manufactured by DIC Co., Ltd. (acrylic polyol (a2)) and 1,6-hexamethylene diisocyanate as an aliphatic isocyanate curing agent are dissolved in toluene to a molar ratio (NCO/OH) of 3.0.

Coating liquid G-2: Coating liquid in which ACTCOL manufactured by Mitsui Chemicals, Inc. (polyether polyol) and 1,6-hexamethylene diisocyanate as an aliphatic isocyanate curing agent are dissolved in toluene to a molar ratio (NCO/OH) of 3.0.

Coating liquid G-3: Coating liquid in which ACRYDIC manufactured by DIC Co., Ltd. (acrylic polyol (a2)) and tolylene diisocyanate as an aromatic isocyanate curing agent are dissolved in toluene to a molar ratio (NCO/OH) of 3.0.

Coating liquid G-4: Coating liquid in which ACTCOL manufactured by Mitsui Chemicals, Inc. (polyether polyol) and tolylene diisocyanate as an aromatic isocyanate curing agent are dissolved in toluene to a molar ratio (NCO/OH) of 3.0.

[Fabrication of Packaging Material for Power Storage Device]

A treatment agent D-1 was coated onto one surface of a metal foil C-1 (the first surface of the metal foil layer 13) and dried to form a corrosion prevention-treated layer 14 on one surface of the metal foil layer 13 (the first surface of the metal foil layer). Then, a film A-1 is bonded, using an adhesive B-1, on the surface opposite to the corrosion prevention-treated layer 14 in the metal foil layer 13 (the second surface of the metal foil layer) by a dry laminate method to laminate the base material layer 11 through the first adhesive layer 12. Then, aging was carried out at 60° C. for 6 days. Next, an adhesive resin E-1 was extruded onto the side of the corrosion prevention-treated layer 14 of the obtained laminate (the first surface side of the metal foil layer) with an extruder, and the film F-1 was bonded thereto and sandwich-laminated to bond the sealant layer 16 through the second adhesive layer 15. Thereafter, the obtained laminate was heated and compressed under the conditions of 160° C., 4 kg/cm$^2$, and 2 m/minutes. Then, coating liquids G-1 to G-4 were coated on the outer surface of the base material layer 11 (the second surface of the base material layer) by a gravure coating method and then aged at 40° C. for 3 days to form a base material protective layer 17, thereby fabricating a packaging material.

[Evaluation of Electrolytic Solution Resistance]

A few drops of an electrolytic solution (an electrolytic solution in which LiPF$_6$ (lithium hexafluorophosphate) was dissolved to a concentration adjusted to 1.5 M with respect to ethylene carbonate/dimethyl carbonate/diethyl carbonate=1/1/1 (mass ratio)) were added dropwise onto the surface of the base material protective layer of the packaging material obtained in each of Examples, and left to stand for 24 hours under an environment of 25° C. and 65% RH. The electrolytic solution was wiped out and the deterioration of the surface of the base material protective layer was visually confirmed. The evaluation was carried out according to the following criteria.

"Excellent": Deterioration of the surface of the base material protective layer was not observed.

"Poor": The surface of the base material protective layer was deteriorated.

Example 1 and Comparative Examples 1 to 3

Using this fabrication method, a packaging material having the configuration shown in Table 1 was fabricated. The evaluation results for the electrolytic solution resistance are shown in Table 1.

TABLE 1

| | Configuration of Packaging Material | | | | | | | | |
|---|---|---|---|---|---|---|---|---|---|
| | Base Material Protective layer 17 | | Base material | First adhesive | Metal foil layer | Corrosion prevention-treated | Second adhesive | Sealant layer | Electrolytic solution |
| | Kind | NCO/OH | layer 11 | layer 12 | 13 | layer 14 | layer 15 | 16 | resistance |
| Example 1 | G-1 | 3.0 | A-1 | B-1 | C-1 | D-1 | E-1 | F-1 | Excellent |
| Comparative Example 1 | G-2 | 3.0 | A-1 | B-1 | C-1 | D-1 | E-1 | F-1 | Poor |
| Comparative Example 2 | G-3 | 3.0 | A-1 | B-1 | C-1 | D-1 | E-1 | F-1 | Poor |
| Comparative Example 3 | G-4 | 3.0 | A-1 | B-1 | C-1 | D-1 | E-1 | F-1 | Poor |

As can be seen from Table 1, the packaging material in Example 1 in which the base material protective layer was formed from the acrylic polyol (a2) and the aliphatic isocyanate curing agent had excellent electrolytic solution resistance, as compared with the packaging materials in Comparative Examples 1 to 3 in which the base material protective layer was formed using at least one of the polyether polyol and the aromatic isocyanate curing agent.

Hereinafter, the materials shown in the second embodiment of the present invention were used in Examples 2 and 3.

<Materials Used>

The materials used in Examples 2 and 3 are shown below.

[Base Material Layer 11]

Film A-1: Nylon 6 film having a thickness of 25 μm.

[First Adhesive Layer 12]

Adhesive B-1: Polyurethane-based adhesive (product name "A525/A50", manufactured by Mitsui Chemicals Inc.).

[Metal Foil Layer 13]

Metal foil C-1: Soft aluminum foil, Material 8079 (manufactured by Toyo Aluminum K. K., thickness of 40 μm).

[Corrosion Prevention-Treated Layer 14]

Treatment agent D-1: "Sodium polyphosphate-stabilized cerium oxide sol" adjusted to a solid concentration of 10% by mass, using distilled water as the solvent. The amount of phosphate was set to 10 parts by weight with respect to 100 parts by weight of cerium oxide.

[Second Adhesive Layer 15]

Adhesive Resin E-1: Maleic anhydride polypropylene.

[Sealant Layer 16]

Film F-1: Polyolefin film having a thickness of 40 μm

[Base Material Protective Layer 17]

Coating liquid G-11: Coating liquid in which ACRYDIC manufactured by DIC Co., Ltd. (acrylic polyol (a2)) and 1,6-hexamethylene diisocyanate as an aliphatic isocyanate curing agent are dissolved in toluene to a molar ratio (NCO/OH) of 20.

Coating liquid G-12: Coating liquid in which ACRYDIC manufactured by DIC Co., Ltd. (acrylic polyol (a2)) and 1,6-hexamethylene diisocyanate as an aliphatic isocyanate curing agent are dissolved in toluene to a molar ratio (NCO/OH) of 2.

Coating liquid G-13: Coating liquid in which ACTCOL manufactured by Mitsui Chemicals, Inc. (polyether polyol) and 1,6-hexamethylene diisocyanate as an aliphatic isocyanate curing agent are dissolved in toluene to a molar ratio (NCO/OH) of 8.

Coating liquid G-14: Coating liquid in which ACRYDIC manufactured by DIC Co., Ltd. (acrylic polyol (a2)) and tolylene diisocyanate as an aromatic isocyanate curing agent are dissolved in toluene to a molar ratio (NCO/OH) of 10.

Coating liquid G-15: Coating liquid in which ACRYDIC manufactured by DIC Co., Ltd. (acrylic polyol (a2)) and 1,6-hexamethylene diisocyanate as an aliphatic isocyanate curing agent are dissolved in toluene to a molar ratio (NCO/OH) of 1.

In addition, the ratio of the polyol to the curing agent in each of the coating liquids was adjusted such that the glass transition temperature Tg of the resin formed became a desired temperature. The glass transition temperature Tg of the resin was measured at a peak temperature (heating rate of 5° C./minute) of the loss tangent (tan θ) at 1 Hz by dynamic viscoelasticity measurement (DMS).

[Fabrication of Packaging Material for Power Storage Device]

A treatment agent D-1 was coated onto one surface of a metal foil C-1 and dried to form a corrosion prevention-treated layer 14 on one surface of the metal foil layer 13. Then, a film A-1 is bonded, using an adhesive B-1, on the surface opposite to the corrosion prevention-treated layer 14 in the metal foil layer 13 by a dry laminate method to laminate the base material layer 11 through the first adhesive layer 12. Then, aging was carried out at 60° C. for 6 days. Next, an adhesive resin E-1 was extruded to the side of the corrosion prevention-treated layer 14 in the obtained laminate with an extruder, and the film F-1 was bonded thereto and sandwich-laminated to bond the sealant layer 16 through the second adhesive layer 15. Thereafter, the obtained laminate was heated and compressed under the conditions of 160° C., 4 kg/cm$^2$, and 2 m/minutes. Then, coating liquids G-11 to G-15 were coated on the outer surface of the base material layer 11 by a gravure coating method and then aged at 40° C. for 3 days to form a base material protective layer 17, thereby fabricating a packaging material.

[Evaluation of Electrolytic Solution Resistance]

A few drops of an electrolytic solution (an electrolytic solution in which LiPF$_6$ (lithium hexafluorophosphate) was dissolved to a concentration adjusted to 1.5 M with respect to ethylene carbonate/dimethyl carbonate/diethyl carbonate=1/1/1 (mass ratio)) were added dropwise onto the surface of the base material protective layer of the packaging material obtained in each of Examples, and left to stand for 24 hours under an environment of 25° C. and 65% RH. The electrolytic solution was wiped out and the deterioration of the surface of the base material protective layer was visually confirmed. The evaluation was carried out according to the following criteria.

"Excellent": Deterioration of the surface of the base material protective layer was not observed.

"Poor": The surface of the base material protective layer was deteriorated.

[Evaluation of Scratch Resistance]

The surface of the base material protective layer of the packaging material obtained in each of Examples was rubbed reciprocally ten times under a load of 150 g/cm$^2$ with #0000 steel wool (manufactured by Nippon Steel Wool Co., Ltd.), and the scratch resistance was evaluated according to the following criteria.

"Excellent": The depth of the damage on the surface of the base material protective layer is less than 1 μm.

"poor": The depth of the damage on the surface of the base material protective layer is 1 μm or more.

Examples 2 to 3 and Comparative Examples 4 to 6

Using this fabrication method, the packaging material having the configuration shown in Table 2 was fabricated. The evaluation results for the electrolytic solution resistance and the scratch resistance are shown in Table 2.

The static friction coefficient of the outer surface was measured by a gradient method (JIS P8147) and was found to be 0.3. For the lamination of the film, a polyurethane-based adhesive (product name "A525/A50", manufactured by Mitsui Chemicals Inc.) was used.

Film A-102: A laminated film formed by coextruding a laminated film of a PET film having a thickness of 10 μm and a Ny film having a thickness of 20 μM, biaxially stretching the film, and then forming irregularities on the outer surface of the biaxially stretched PET film by sand blasting. The static friction coefficient of the outer surface was measured by a gradient method and was found to be 0.3. As the adhesive, polypropylene graft-modified with maleic anhydride was used.

Film A-103: A laminated film formed by laminating a biaxially stretched PET film having a thickness of 12 μm and a biaxially stretched Ny film having a thickness of 15 μm by a dry laminate method. The static friction coefficient of the biaxially stretched PET film was 0.5. As the adhesive, the same adhesive as the film A-101 was used.

TABLE 2

| | Configuration of Packaging Material | | | | | | | | | | |
|---|---|---|---|---|---|---|---|---|---|---|---|
| | Base material protective layer 17 | | | Base material layer 11 | First adhesive layer 12 | Metal foil layer 13 | Corrosion prevention-treated layer 14 | Second adhesive layer 15 | Sealant layer 16 | Electrolytic solution resistance | Scratch resistance |
| | Kind | NCO/OH | Tg [° C.] | | | | | | | | |
| Example 2 | G-11 | 20 | 6 | A-1 | B-1 | C-1 | D-1 | E-1 | F-1 | Excellent | Excellent |
| Example 3 | G-12 | 2 | 52 | A-1 | B-1 | C-1 | D-1 | E-1 | F-1 | Excellent | Excellent |
| Comparative Example 4 | G-13 | 8 | 30 | A-1 | B-1 | C-1 | D-1 | E-1 | F-1 | Poor | Excellent |
| Comparative Example 5 | G-14 | 10 | 80 | A-1 | B-1 | C-1 | D-1 | E-1 | F-1 | Poor | Poor |
| Comparative Example 6 | G-15 | 1 | 80 | A-1 | B-1 | C-1 | D-1 | E-1 | F-1 | Excellent | Poor |

As can be seen from Table 2, the packaging materials of Examples 2 and 3 having a base material protective layer of a urethane resin having a glass transition temperature Tg of 0° C. to 60° C., formed from the acrylic polyol (a2) and the aliphatic isocyanate curing agent had both of excellent electrolytic solution resistance and scratch resistance.

On the other hand, the packaging material of Comparative Example 4 using a polyether polyol instead of the acrylic polyol (a2) had deteriorated electrolytic solution resistance. Furthermore, the packaging material of Comparative Example 5 using an aromatic isocyanate curing agent instead of the aliphatic isocyanate curing agent had both of deteriorated electrolytic solution resistance and scratch resistance. In addition, the packaging material of Comparative Example 6 using the acrylic polyol (a2) and the aliphatic isocyanate curing agent but having a glass transition temperature Tg out of the range of 0° C. to 60° C. had deteriorated scratch resistance.

Hereinafter, in Examples 4 and 5, the materials in the third embodiment of the present invention were used.

<Materials Used>

The materials used in Examples 4 and 5 are shown below.

[Base Material Layer 111]

Film A-101: A laminated film formed by laminating a biaxially stretched polyethylene terephthalate (PET) film having a thickness of 12 μm and a biaxially stretched nylon (Ny) film having a thickness of 15 μm by a dry laminate method in which irregularities are formed on the outer surface of the biaxially stretched PET film by sand blasting.

Film A-104: A laminated film formed by laminating a biaxially stretched PET film having a thickness of 10 μm and a biaxially stretched Ny film having a thickness of 5 μm by a dry laminate method, and forming irregularities on the outer surface of the biaxially stretched PET film by sand blasting. The static friction coefficient of the outer surface was measured by a gradient method and was found to be 0.3. As the adhesive, the same adhesive as the film A-101 was used.

[First Adhesive Layer 112]

Adhesive B-101: Polyurethane-based adhesive (product name "A525/A50", manufactured by Mitsui Chemicals Inc.).

[Metal Foil Layer 113]

Metal foil C-101: Soft aluminum foil, Material 8079 (manufactured by Toyo Aluminum K. K., thickness of 40 μm).

[Corrosion Prevention-Treated Layer 114]

Treatment agent D-101: A treatment agent prepared by adjusting 10 parts by mass of sodium polyphosphate with respect to 100 parts by weight of cerium oxide to a solid concentration of 10% by mass, using distilled water (treatment agent including cerium oxide sol).

[Second Adhesive Layer 115]

Adhesive Resin E-101: Polypropylene graft-modified with maleic anhydride.

[Sealant Layer 116]

Film F-101: Unstretched polypropylene film having a thickness of 40 μm.

[Fabrication of Packaging Material for Power Storage Device]

A coating agent D-101 was coated on one surface of the metal foil C-101 (the first surface of the metal foil layer 113), and dried to form a corrosion prevention-treated layer 114 on one surface of the metal foil layer 113 (the first surface of the metal foil layer). Then, the films A-101 to A-104 were bonded on the surface opposite to the corrosion prevention-treated layer 114 in the metal foil layer 113 (the second surface of the metal foil layer), with the biaxially stretched PET film being on the outer side, by a dry laminate method using the adhesive B-101 to laminate the base material layer 111 through the first adhesive layer 112. Then, aging was carried out at 60° C. for 6 days. Next, the adhesive resin E-101 was extruded on the side of the corrosion prevention-treated layer 114 in the obtained laminate (the first surface of the metal foil layer) with an extruder, and the film F-101 was bonded and sandwich-laminated to bond the sealant layer 116 through the second adhesive layer 115. Thereafter, the obtained laminate was subjected to heating and compression under the conditions of 160° C., 4 kg/cm², and 2 m/minute.

[Evaluation of Electrolytic Solution Resistance]

A few drops of an electrolytic solution (an electrolytic solution in which LiPF$_6$ (lithium hexafluorophosphate) was dissolved to a concentration adjusted to 1.5 M with respect to ethylene carbonate/dimethyl carbonate/diethyl carbonate=1/1/1 (mass ratio)) were added dropwise onto the surface of the base material protective layer of the packaging material obtained in each of Examples, and left to stand for 24 hours under an environment of 25° C. and 65% RH. The electrolytic solution was wiped out and the deterioration of the surface of the base material protective layer was visually confirmed. The evaluation was carried out according to the following criteria.

"Excellent": Deterioration of the surface of the base material protective layer was not observed.

"Poor": The surface of the base material protective layer was deteriorated.

[Evaluation of Abrasion Resistance]

The outer surface (on the side of the base material layer) of the packaging material was rubbed reciprocally ten times under a load of 150 g/cm² with #0000 steel wool (manufactured by Nippon Steel Wool Co., Ltd.), and the degree of damage was evaluated according to the following criteria.

"Excellent": Abrasion was not generated.

"Good": Slight abrasion was generated.

"Poor": A lot of damage was generated.

[Evaluation of Moldability]

The obtained packaging material was subjected to cold molding to a squeeze length of 6 mm, using a molding device capable of cold molding with a squeeze portion in 80 mm×100 mm Thereafter, the breakage or pinholes in the portion that had been cold-molded was confirmed. The evaluation of the moldability was carried out according to the following criteria.

Excellent: There is no breakage or pinholes.

Poor: The breakage or pinholes are generated.

Examples 4 to 5 and Comparative Examples 7 to 8

Using this fabrication method, the packaging material having the configuration shown in Table 3 was fabricated. The evaluation results for the electrolytic solution resistance, the abrasion resistance, and the moldability are shown in Table 3.

TABLE 3

| | Configuration of Packaging Material | | | | | | | | |
|---|---|---|---|---|---|---|---|---|---|
| | Base material layer 111 | First adhesive layer 112 | Metal foil layer 113 | Corrosion prevention-treated layer 114 | Second adhesive layer 115 | Sealant layer 116 | Electrolytic solution resistance | Abrasion resistance | Moldability |
| Example 4 | A-101 | B-101 | C-101 | D-101 | E-101 | F-101 | Excellent | Excellent | Excellent |
| Example 5 | A-102 | B-101 | C-101 | D-101 | E-101 | F-101 | Excellent | Excellent | Excellent |
| Comparative Example 7 | A-103 | B-101 | C-101 | D-101 | E-101 | F-101 | Excellent | Excellent | Poor |
| Comparative Example 8 | A-104 | B-101 | C-101 | D-101 | E-101 | F-101 | Excellent | Excellent | Poor |

As can be seen from Table 3, a biaxially stretched PET was laminated on the outer side of the biaxially stretched Ny film having a thickness of 6 to 40 μm, and Furthermore, the packaging materials having irregularities formed on the outer surface in Examples 4 and 5 had excellent electrolytic solution resistance, abrasion resistance, and moldability. On the other hand, with the packaging material in Comparative Example 7 in which irregularities are not formed on the outer surface of the biaxially stretched PET film in the base material layer, excellent electrolytic solution resistance and abrasion resistance are obtained, but sufficient moldability was not obtained. Furthermore, the biaxially stretched PET film and the biaxially stretched Ny film are laminated from the outer side, irregularities are formed on the outer surface, and even in Comparative Example 8, in which the thickness of the biaxially stretched Ny film is less than 6 μm, excellent electrolytic solution resistance and abrasion resistance were obtained, but sufficient moldability was not obtained.

What is claimed is:

1. A packaging material for a power storage device, comprising:
    a base material layer being a stretched polyamide film having a first surface and a second surface;
    a sealant layer;
    a first adhesive layer laminated between the first surface of the stretched polyamide film and the sealant layer;
    a first corrosion prevention-treated layer laminated between the first adhesive layer and the sealant layer;
    a metal foil layer laminated between the first corrosion prevention-treated layer and the sealant layer;
    a second corrosion prevention-treated layer laminated between the metal foil layer and the sealant layer;
    a second adhesive layer laminated between the second corrosion prevention-treated layer and the sealant layer; and a base material protective layer laminated and coated on the second surface of the stretched polyamide film, the base material protective layer being a urethane resin formed from at least one polyol selected from the group consisting of polyester polyols and acrylic polyols, each of the polyester polyols and the acrylic polyols containing a group having a hydroxyl group in a side chain thereof, the base material protective layer containing the urethane resin formed from an aliphatic isocyanate curing agent containing an isocyanate group (NCO), the base material protective layer having a matting-treated surface, the aliphatic isocyanate curing agent being 1,6-hexamethylene diisocyanate, wherein a molar ratio (NCO/OH) of the isocyanate group (NCO) contained in the aliphatic isocyanate curing agent and the hydroxyl group (OH) contained in the at least one polyol is from 0.5 to 50.

2. The packaging material for a power storage device according to claim 1, wherein the base material protective layer includes a filler added to the base material protective layer.

3. The packaging material for a power storage device according to claim 2, wherein the filler includes a resin filler.

4. The packaging material for a power storage device according to claim 1, wherein the metal foil layer is an aluminum foil.

5. The packaging material for a power storage device according to claim 1, wherein the base material protective layer has a thickness of 1 to 10 μm.

6. The packaging material for a power storage device according to claim 1, wherein the base material protective layer includes additives blended in the base material protective layer.

7. The packaging material for a power storage device according to claim 1, wherein the urethane resin of the base material protective layer is a non-aqueous urethane.

8. The packaging material for a power storage device according to claim 1, wherein the urethane resin has a glass transition temperature Tg of 0° C. to 60° C.

* * * * *